US010950907B2

(12) United States Patent
Yamamoto et al.

(10) Patent No.: US 10,950,907 B2
(45) Date of Patent: Mar. 16, 2021

(54) BATTERY PACK

(71) Applicant: DENSO CORPORATION, Kariya (JP)

(72) Inventors: Hiroyoshi Yamamoto, Kariya (JP); Yoshimitsu Inoue, Kariya (JP); Kouji Yamashita, Kariya (JP)

(73) Assignee: DENSO CORPORATION, Kariya (JP)

( * ) Notice: Subject to any disclaimer, the term of this patent is extended or adjusted under 35 U.S.C. 154(b) by 482 days.

(21) Appl. No.: 15/750,868

(22) PCT Filed: Aug. 1, 2016

(86) PCT No.: PCT/JP2016/072495
§ 371 (c)(1),
(2) Date: Feb. 7, 2018

(87) PCT Pub. No.: WO2017/026312
PCT Pub. Date: Feb. 16, 2017

(65) Prior Publication Data
US 2018/0241106 A1    Aug. 23, 2018

(30) Foreign Application Priority Data
Aug. 7, 2015 (JP) .............................. JP2015-157252

(51) Int. Cl.
*H01M 10/6566* (2014.01)
*H01M 10/613* (2014.01)
(Continued)

(52) U.S. Cl.
CPC ......... *H01M 10/6566* (2015.04); *H01M 2/10* (2013.01); *H01M 2/1077* (2013.01);
(Continued)

(58) Field of Classification Search
CPC ........................................ H01M 10/65–6566
See application file for complete search history.

(56) References Cited

U.S. PATENT DOCUMENTS

2012/0214041 A1\* 8/2012 Harada ............... H01M 10/617
429/120
2014/0356660 A1   12/2014 Inoue
2015/0037632 A1   2/2015 Yamamoto et al.

FOREIGN PATENT DOCUMENTS

JP    2002-313440 A    10/2002
JP    2009-170370 A    7/2009
(Continued)

OTHER PUBLICATIONS

Oct. 18, 2016 International Search Report issued in International Patent Application No. PCT/JP2016/072495.
(Continued)

*Primary Examiner* — Stephan J Essex
(74) *Attorney, Agent, or Firm* — Oliff PLC

(57) ABSTRACT

A battery pack includes a plurality of battery cells, case (housing), circulation path, and blower. The circulation path includes battery paths, inflow side space, outflow side space, and a path along the housing. The battery paths are formed by gaps between adjacent battery cells. The inflow side space distributes fluid to the inlets of the battery paths. The outflow side space gathers fluid from the outlets of the battery paths. The path along the housing is a path that is different from the inflow side space and outflow side space and extends along one or more inner surfaces of the case. The circulation path is formed such that at least one of a flow velocity of the fluid in the inflow side space and a flow velocity of the fluid in the outflow side space is slower than a flow velocity of the fluid in the path along the housing.

8 Claims, 10 Drawing Sheets

(51) Int. Cl.
*H01M 10/617* (2014.01)
*H01M 10/6551* (2014.01)
*H01M 10/6557* (2014.01)
*H01M 10/6565* (2014.01)
*H01M 2/10* (2006.01)
*H01M 10/625* (2014.01)

(52) U.S. Cl.
CPC ....... *H01M 10/613* (2015.04); *H01M 10/617* (2015.04); *H01M 10/625* (2015.04); *H01M 10/6551* (2015.04); *H01M 10/6557* (2015.04); *H01M 10/6565* (2015.04); *H01M 2220/20* (2013.01)

(56) References Cited

FOREIGN PATENT DOCUMENTS

| | | |
|---|---|---|
| JP | 2009-211829 A | 9/2009 |
| JP | 2010-015955 A | 1/2010 |
| JP | 2010-123298 A | 6/2010 |
| JP | 2013-244861 A | 12/2013 |
| JP | 2015-046321 A | 3/2015 |

OTHER PUBLICATIONS

U.S. Appl. No. 15/750,859, filed Feb. 7, 2018 in the name of Kouji Yamashita et al.

\* cited by examiner (SECOND EMBODIMENT)

(FIFTH EMBODIMENT)

ly.
BATTERY PACK

CROSS-REFERENCE TO RELATED APPLICATION

This application is the U.S. national phase of International Application No. PCT/JP2016/072495 filed Aug. 1, 2016 which designated the U.S. and claims priority to JP Patent Application No. 2015-157252 filed Aug. 7, 2015, the entire contents of each of which are hereby incorporated by reference.

TECHNICAL FIELD

The present invention relates to a battery pack having a plurality of battery cells accommodated in a case.

BACKGROUND ART

Conventionally, as an example of a battery pack having a battery cell, for example, the battery pack described in PTL 1 is known. The battery pack (battery cooling device) described in PTL 1 includes a plurality of battery cells, a casing that accommodates the battery cells, a circulation path through which a fluid that exchanges heat with (cools) the battery cells in the casing flows, and a blower for circulating the fluid in the circulation path.

The casing has a hexahedral shape having a top wall, a bottom wall, and four side walls. Further, the circulation path includes a side wall side path extending along the side wall, a top wall side path extending along the top wall, a battery path formed by the gap between adjacent battery cells, and a bottom wall side path extending along the bottom wall. The fluid blown out from the blower sequentially flows from the side wall side path to the top wall side path, the battery path, and finally the bottom wall side path.

CITATION LIST

Patent Literature

SUMMARY OF THE INVENTION

Technical Problem

However, in the case of the above-described circulation path, the amount of the fluid flowing from the top wall side path into each battery path will somewhat vary. In addition, the amount of the fluid flowing out from each battery path to the bottom wall side path will somewhat vary. These variations cause variation in the temperature distribution of the battery cells, for example, some battery cells being sufficiently cooled while other battery cells being not cooled much, and as a result, the battery pack as a whole cannot sufficiently exert its charging/discharging performance.

The present invention has been devised in view of the above problem, and an object thereof is to provide a battery pack configured to reduce the variation in the temperature distribution of battery cells.

Solution to Problem

The invention disclosed herein employs the following technical means to attain the above object.

A first invention disclosed herein is a battery pack including a plurality of battery cells, a housing accommodating the battery cells therein, a circulation path formed in the housing and through which a heat exchange fluid circulates so as to transfer the heat of the battery cells to the housing, and a blower for causing the fluid to flow through the circulation path. The circulation path includes a plurality of battery paths formed by the gaps between adjacent battery cells, an inflow side space which is a space facing the inlets of the battery paths and configured to distribute the fluid to the inlets, an outflow side space which is a space facing the outlets of the battery paths and configured to gather the fluid from the outlets, and a path along the housing which is a path that is different from the inflow side space and the outflow side space and extends along one or more inner surfaces of the housing. The circulation path is formed such that both of a flow velocity of the fluid in the inflow side space and a flow velocity of the fluid in the outflow side space are slower than a flow velocity of the fluid in the path along the housing.

The sum of the flow velocity energy and the pressure energy of the fluid flowing through the circulation path is constant according to Bernoulli's theorem. For example, if the path cross-sectional area is reduced to increase the flow velocity, the pressure energy decreases by an amount corresponding to the increase in the flow velocity energy. On the other hand, for example, if the path cross-sectional area is increased to reduce the flow velocity, the pressure energy increases by an amount corresponding to the decrease in the flow velocity energy. An increase in the pressure energy means that the fluid becomes more statically pressurized and the flow distribution becomes more uniform. In other words, in a space where the fluid is statically pressurized, the variation in the pressure distribution of the fluid is small.

The first invention which takes into consideration this point is configured such that both of a flow velocity (V2) of the fluid in the inflow side space and a flow velocity (V4) of the fluid in the outflow side space are slower than a flow velocity (V1) of the fluid in the path along the housing. Thus, when the flow velocity in the inflow side space is slower than the flow velocity in the path along the housing (V2<V1), the fluid becomes statically pressurized in the inflow side space and the pressure distribution becomes uniform. Therefore, the variation in the distribution of the inflow amount of the fluid flowing into the battery paths from the inflow side space is reduced. Further, when the flow velocity in the outflow side space is slower than the flow velocity in the path along the housing (V4<V1), the fluid becomes statically pressurized in the outflow side space and the pressure distribution becomes uniform. Therefore, the variation in the distribution of the outflow amount of the fluid flowing out from the battery paths into the outflow side space is reduced.

As described above, according to the first invention, the distribution variation of the amount of inflow into the battery paths and the amount of outflow from the battery paths are reduced. Thus, it is possible to reduce the variation in the flow rate distribution of the fluid flowing through the battery paths, and accordingly, the variation in the amount of heat dissipation from the battery cells. Thus, since the temperature distribution variation of the battery cells can be reduced, it is possible to aid the entire battery pack to fully exert its charging and discharging performance.

Further, according to the first invention, it can be said that the flow velocity in the path along the housing is made faster than the flow velocity in the inflow side space and the outflow side space. Therefore, the flow velocity energy of the fluid in the path along the housing increases by an amount corresponding to the decrease in the pressure energy, and the flow velocity increases as compared with the fluid in the inflow side space or the outflow side space. Thus, the heat transfer coefficient of when the heat of the fluid moves to the housing can be increased, and the amount of heat dissipated from the housing to the external air can be increased. Moreover, the greater the flow velocity, the smaller the variation in the heat transfer coefficient caused by the variation in the flow velocity. Thus, it is possible to suppress the variation in the fluid temperature such as the temperature of the fluid being different depending on the location of the path along the housing where it flows out, and accordingly, the variation in the temperature distribution of the battery cells can be reduced.

Although the variation in the flow velocity distribution is increased due to the increase in the flow velocity energy in the path along the housing, as described above, the fluid becomes statically pressurized in the inflow side space or the outflow side space. Thus, it is possible to achieve both the temperature distribution variation of the battery cells due to the variation in the distribution of the fluid to the battery paths and an increase in the amount of heat radiation in the path along the housing.

A second invention disclosed herein is a battery pack including a plurality of battery cells, a housing accommodating the battery cells therein, a circulation path formed in the housing and through which a heat exchange fluid circulates so as to transfer the heat of the battery cells to the housing, and a blower for causing the fluid to flow through the circulation path. The circulation path includes a plurality of battery paths formed by the gaps between adjacent battery cells, an inflow side space which is a space facing the inlets of the battery paths and configured to distribute the fluid to the inlets, an outflow side space which is a space facing the outlets of the battery paths and configured to gather the fluid from the outlets, and a path along the housing which is a path that is different from the inflow side space and the outflow side space and extends along one or more inner surfaces of the housing. The circulation path is formed such that both of a flow velocity of the fluid in the inflow side space and a flow velocity of the fluid in the outflow side space are slower than a flow velocity of the fluid in the battery paths.

The second invention is configured such that both of a flow velocity (V2) of the fluid in the inflow side space and a flow velocity (V4) of the fluid in the outflow side space are slower than a flow velocity (V3) of the fluid in the battery paths. Thus, when the flow velocity in the inflow side space is slower than the flow velocity in the battery paths (V2<V3), the fluid becomes statically pressurized in the inflow side space and the pressure distribution becomes uniform. Therefore, the variation in the distribution of the inflow amount of the fluid flowing into the battery paths from the inflow side space is reduced. Further, when the flow velocity in the outflow side space is slower than the flow velocity in the battery paths (V4<V3), the fluid becomes statically pressurized in the outflow side space and the pressure distribution becomes uniform. Therefore, the variation in the distribution of the outflow amount of the fluid flowing out from the battery paths into the outflow side space is reduced.

As described above, according to the second invention, the distribution variation of the amount of inflow into the battery paths and the amount of outflow from the battery paths are reduced. Thus, it is possible to reduce the variation in the flow rate distribution of the fluid flowing through the battery paths, and accordingly, the variation in the amount of heat dissipation from the battery cells. Thus, since the temperature distribution variation of the battery cells can be reduced, it is possible to aid the entire battery pack to fully exert its charging and discharging performance.

Further, according to the second invention, it can be said that the flow velocity in the battery paths is made faster than the flow velocity in the inflow side space and the outflow side space. Therefore, the flow velocity energy of the fluid in the battery paths increases by an amount corresponding to the decrease in the pressure energy, and the flow velocity increases as compared with the fluid in the inflow side space or the outflow side space. Thus, the heat transfer coefficient of when the heat of the battery cells moves to the fluid can be increased, and the amount of heat dissipated from the battery cells to the fluid can be increased. Moreover, the greater the flow velocity, the smaller the variation in the heat transfer coefficient caused by the variation in the flow velocity. Thus, it is possible to reduce the variation in the temperature distribution of the battery cells.

Although the variation in the flow velocity distribution is increased due to the increase in the flow velocity energy in the battery paths, as described above, the fluid becomes statically pressurized in the inflow side space or the outflow side space. Thus, it is possible to achieve both the temperature distribution variation of the battery cells due to the variation in the distribution of the fluid to the battery paths and an increase in the amount of heat radiation in the battery paths.

A third invention disclosed herein is a battery pack including a plurality of battery cells, a housing accommodating the battery cells therein, a circulation path formed in the housing and through which a heat exchange fluid circulates so as to transfer the heat of the battery cells to the housing, and a blower for causing the fluid to flow through the circulation path. The circulation path includes a plurality of battery paths formed by gaps between adjacent battery cells, an inflow side space which is a space facing inlets of the battery paths, an outflow side space which is a space facing outlets of the battery paths, a path along the housing which is a path that is different from the inflow side space and the outflow side space and extends along one or more inner surfaces of the housing, and the circulation path is formed such that at least one of a flow velocity of the fluid in the inflow side space and a flow velocity of the fluid in the outflow side space is slower than a flow velocity of the fluid in the path along the housing. The path along the housing is divided into a fin region where the fins are arranged and a finless region communicating with the upstream side of the fin region and where the fins are not arranged, and an area of a fin inlet which is an inlet through which the fluid flows into the fin region is larger than an area of a finless inlet which is an inlet through which the fluid flows into the finless region.

A fourth invention disclosed herein is a battery pack including a plurality of battery cells, a housing accommodating the battery cells therein, a circulation path formed in the housing and through which a heat exchange fluid circulates so as to transfer the heat of the battery cells to the housing, and a blower for causing the fluid to flow through the circulation path. The circulation path includes a plurality of battery paths formed by gaps between adjacent battery cells, an inflow side space which is a space facing inlets of the battery paths, an outflow side space which is a space facing outlets of the battery paths, a path along the housing which is a path that is different from the inflow side space and the outflow side space and extends along one or more inner surfaces of the housing, and the circulation path is formed such that at least one of a flow velocity of the fluid in the inflow side space and a flow velocity of the fluid in the outflow side space is slower than a flow velocity of the fluid in the battery paths. The path along the housing is divided into a fin region where the fins are arranged and a finless region communicating with the upstream side of the fin region and where the fins are not arranged, and an area of a fin inlet which is an inlet through which the fluid flows into the fin region is larger than an area of a finless inlet which is an inlet through which the fluid flows into the finless region.

DESCRIPTION OF THE EMBODIMENTS

Figure 1:
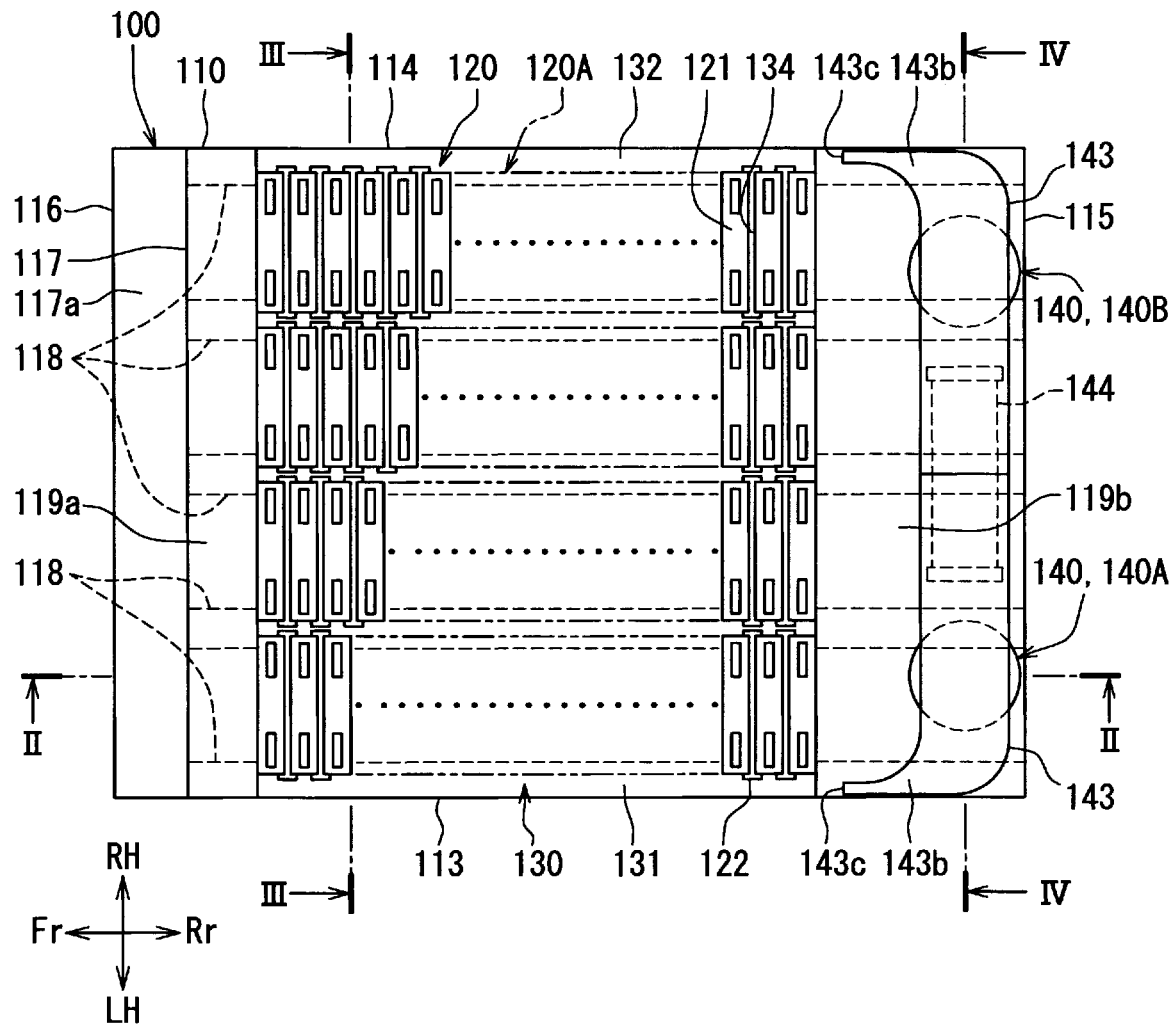
FIG. 1 is a plan view showing the configuration of a battery pack according to a first embodiment of the present invention.

Embodiments for implementing the present invention will be described with reference to the drawings. Components of an embodiment corresponding to matters that have been already described with a preceding embodiment may be denoted by the same reference symbols, and redundant explanation may be omitted. When only a part of the configuration of an embodiment is described, the other embodiments described previously can be applied for the other part of the configuration. Not only those combinations of parts that are clearly indicated to be combinable specifically in relation to the embodiments, but also combinations of parts of embodiments that are not clearly indicated may be implemented if there is no obstruction in the combination.

First Embodiment

A battery pack 100 of a first embodiment which is an example of the present invention will be described with reference to FIGS. 1 to 7. For example, although not shown in detail, the battery pack 100 may be used in a hybrid vehicle which uses a motor driven by electric power charged in a battery and an internal combustion engine as its driving power sources, or an electric vehicle which uses a motor as its driving power source. The plurality of battery cells 121 included in the battery pack 100 are, for example, nickel hydrogen secondary batteries, lithium ion secondary batteries, or organic radical batteries.

The battery pack 100 is installed in a pack accommodation space (not shown) such as a trunk of the vehicle or a trunk back area provided below the trunk. For example, a spare tire, tools, and the like may also be stored in this pack accommodation space. The battery pack 100 is installed in the pack accommodation space with the bottom wall 112 and the bottom wall side path 135 at the bottom.

Although not shown in detail, for example, the battery pack 100 may be installed below the front seats or the rear sheets provided in the vehicle. In such case, the battery pack 100 is installed below the front seats, the rear seats, or the like with the bottom wall 112 and the bottom wall side path 135 at the bottom. Further, the space in which the battery pack 100 is installed below the rear seats may communicate with the trunk back area below the trunk. Further, the installation space can also be configured to communicate with the outside of the vehicle.

The battery pack 100 includes a case 110, an assembled battery 120 (cell laminate 120A), a circulation path 130, a blower 140, and the like. The case 110 forms a sealed interior space isolated from the outside. The assembled battery 120 is made up of a plurality of battery cells 121 that are energizably connected. The circulation path 130 is a path formed in the case 110 through which a fluid for heat exchange flows. The blower 140 circulates the fluid in the circulation path 130.

Figure 5:
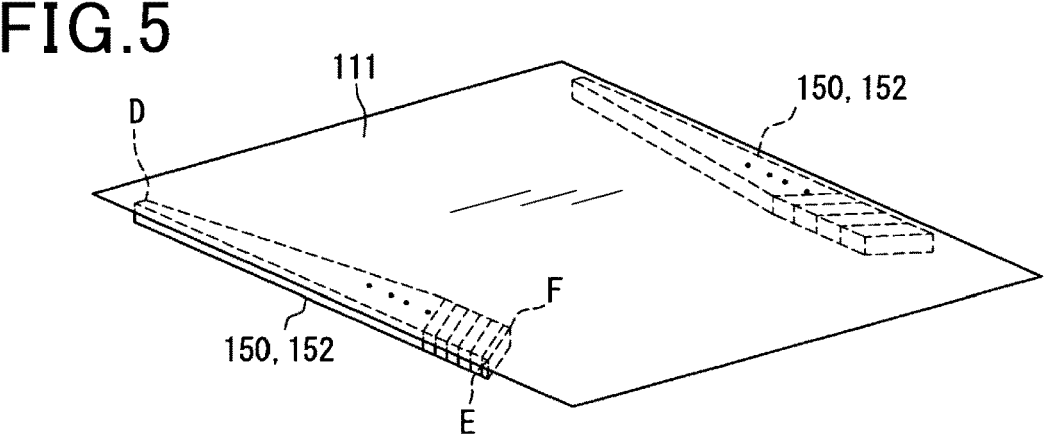
FIG. 5 is an exploded perspective view showing internal fins.
Figure 5:
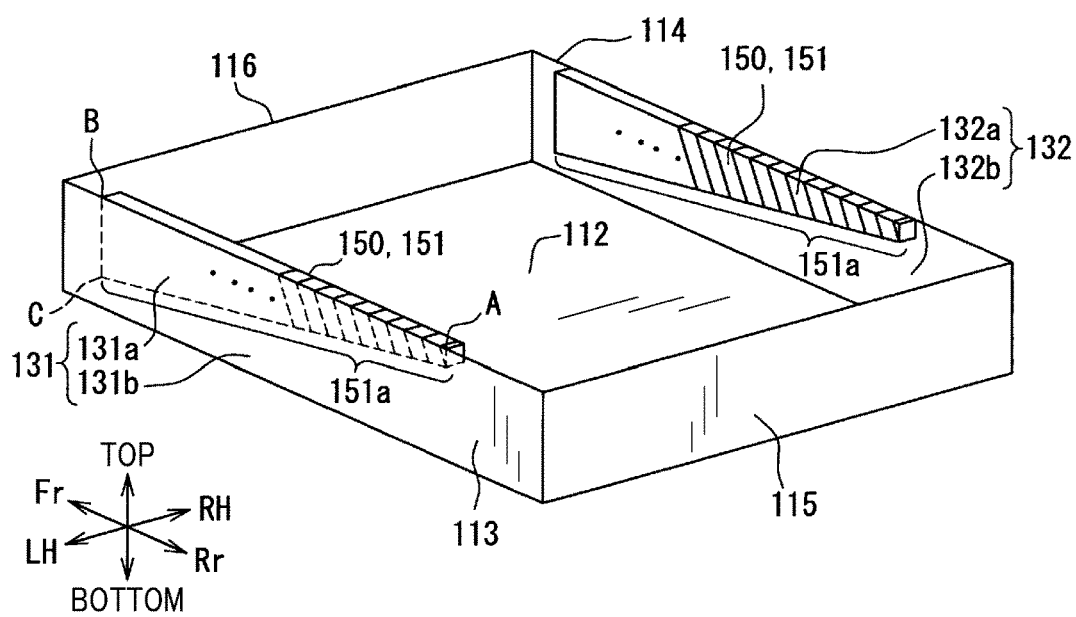
Figure 6:
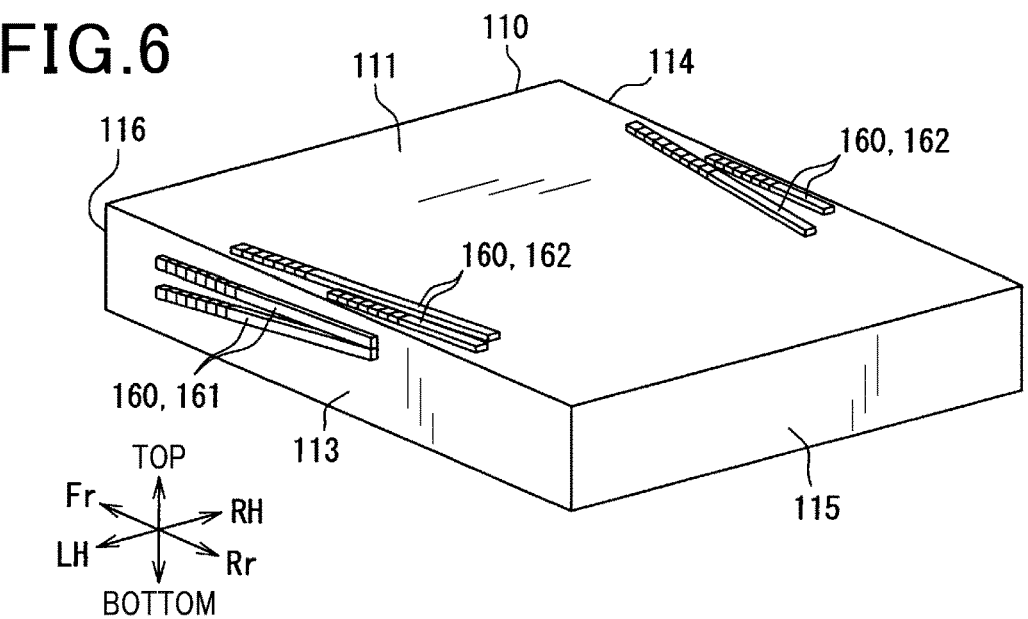
FIG. 6 is a perspective view showing external fins.

In the battery pack 100, internal fins 150 (151, 152) are provided inside the case 110, and external fins 160 (161, 162) are provided outside the case 110 (see FIGS. 5 and 6). Further, an external duct 170 having a blower 172 is provided outside the external fins 160 (see FIG. 7).

In the present embodiment, in FIG. 1, Fr denotes the front side of the vehicle, Rr denotes the rear side of the vehicle, RH denotes the right side of the vehicle, and LH denotes the left side of the vehicle. When indicating directions in the battery pack 100, the Fr-Rr direction of is referred to as the front-rear direction, and the RH-LH direction is referred to as the left-right direction. Further, the direction in which gravity acts will be referred to as the vertical direction.

The case 110 is a housing that houses the assembled battery 120 and blowers 140 (140A, 140B). The case 110 takes the form of a box including a plurality of walls surrounding the internal space and is formed of a molded product of an aluminum plate or an iron plate. For example, the case 110 is a cuboid that is flat in the vertical direction, and has a hexahedral shape having six faces, namely, a top wall 111, a bottom wall 112, a first side wall 113, a second side wall 114, a third side wall 115, and a fourth side wall 116. In addition, the case 110 includes a partition wall 117 for partitioning the interior space, and beams 118 for reinforcement at the bottom wall 112.

The top wall 111 is a wall forming the upper surface of the case 110, and is a rectangular wall having long sides in the front-rear direction. The bottom wall 112 is a wall forming the lower surface of the case 110, and has the same shape as the top wall 111.

The first and second side walls 113, 114 are walls forming the left and right surfaces of the case 110, and are elongated rectangular walls having long sides in the front-rear direction. The first and second side walls 113, 114 are in such a positional relationship that they face each other. The third and fourth side walls 115, 116 are walls forming the front and rear surfaces of the case 110, and are elongated rectangular walls having long sides in the left-right direction. The third and fourth side walls 115, 116 are in such a positional relationship that they face each other. In addition, the third and fourth side walls 115, 116 are walls orthogonal to the first and second side walls 113, 114.

Instead of the case with the above-described walls 111 to 116, the case 110 may be formed by assembling a plurality of case parts so that a box-shaped space is created therein. Further, on the surface of one or more of the walls of the case 110, a plurality of protrusions or recesses may be formed in order to increase the heat radiation area.

In the battery pack 100, the direction along the long sides of the first and second side walls 113, 114 corresponds to the front-rear direction, and the direction along the long sides of the third and fourth side walls 115, 116 corresponds to the left-right direction.

The partition wall 117 is provided near the fourth side wall 116 inside the case 110 and parallel to the fourth side wall 116, and it is a wall connecting the first and second side walls 113, 114. The partition wall 117 extends from the upper surface of the bottom wall 112, that is, the surface that faces the inside of the case 110, to an intermediate position in the vertical direction of the case 110. A space 117a is formed between the partition wall 117 and the fourth side wall 116. For example, a battery management unit (not shown) is accommodated in the space 117a.

The battery management unit is configured to be able to communicate with various electronic control devices mounted in the vehicle. The battery management unit is a device that manages at least the amount of electricity stored in the battery cells 121, and is an example of a battery control unit that performs control related to the battery cells 121. The battery management unit may also be a device that monitors current, voltage, temperature, and the like related to the battery cells 121, and manages an abnormal state, electric leakage, and the like of the battery cells 121.

Further, a signal related to the current value detected by a current sensor is input to the battery management unit. As with a vehicle ECU, the battery management unit includes an input circuit, a microcomputer, an output circuit, and the like. Battery information is constantly accumulated as data in the memory means of the microcomputer The accumulated battery information data includes, for example, the battery voltage, charging current, discharging current, battery temperature, and the like in the battery pack 100.

The battery management unit also functions as a control device for controlling the operation of the blowers 140A and 140B, the blower 172, and a PTC heater 144. Temperature information detected by a temperature detector for detecting the temperature of the battery cell 121 is input to the battery management unit. The temperature detector is provided for each battery cell 121 or one or more certain battery cells 121. The temperature detector can be constituted by a temperature detection line for outputting a signal to the battery management unit, a temperature sensor, and the like.

When the conditions for executing battery cooling or battery heating are satisfied according to the battery temperature detected by the temperature detector, the battery management unit controls the operation of each of the blowers 140A, 140B, the blower 172, and the PTC heater 144.

Figure 2:
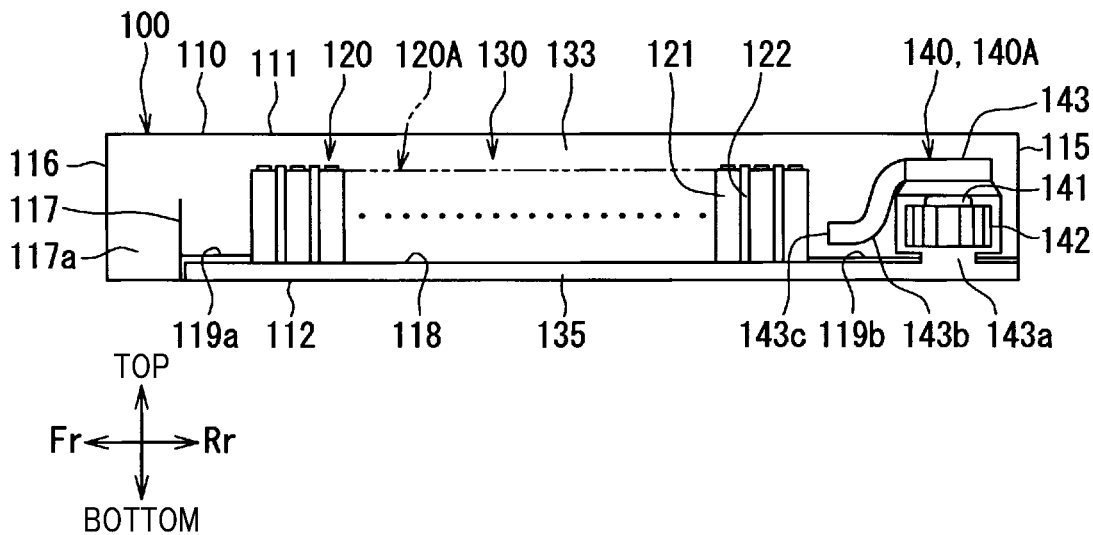
FIG. 2 is a cross-sectional view taken along the line II-II in FIG. 1.
Figure 3:
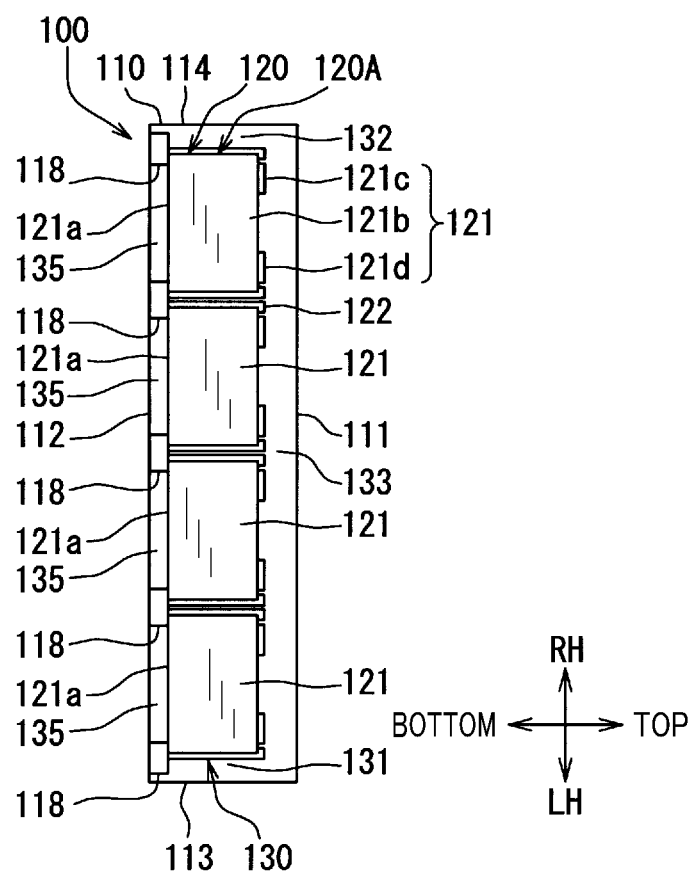
FIG. 3 is a cross-sectional view taken along the line III-III in FIG. 1.

As shown in FIGS. 1 to 3, the beams 118 are reinforcing members for improving the strength of the case 110, and they are arranged in parallel with the upper surface of the bottom wall 112, that is, the inner surface of the case 110. In the present embodiment, the number of beams 118 is five. The beams 118 have an elongated rod shape, and are arranged on the bottom wall 112 so that their longitudinal direction is in the front-rear direction of the case 110 and at equal intervals in the left-right direction.

The beams 118 are formed separately from the case 110, and are made of, for example, an aluminum material, an iron material, or the like. The outer two beams 118 among the five beams 118 extend along (are in contact with) the first and second side walls 113, 114, respectively. In addition, the remaining three beams 118 are arranged between the two beams 118. The intervals between the five beams 118 are equal intervals. The pitch (distance between centerlines) between the beams 118 is set to be about the same as the dimension of the battery cell 121 in the left-right direction. The dimension between two adjacent beams 118 is set to be larger than the width of one beam 118. The width of a beam 118 is the dimension in the direction in which the beams 118 are arranged.

One end of the beam 118 in the longitudinal direction is in contact with the partition wall 117 and the other end of the beam 118 in the longitudinal direction is in contact with the third side wall 115. The length of the beams 118 is set so as to be longer than the length of the battery cells 121 as a whole in the direction along the beams 118. In other words, the longitudinal dimension of the beams 118 is set to be longer than the stacking direction dimension of the cell lamination 120A formed by the battery cells 121.

Between the partition wall 117 and the battery cells 121 (assembled battery 120), a plate-shaped closing wall 119a connecting the first side wall 113 and the second side wall 114 is provided over the upper surfaces of the beams 118. The upper side of the spaces between adjacent beams 118 is closed by the closing wall 119a.

Similarly, between the third side wall 115 and the battery cells 121 (assembled battery 120), a plate-shaped closing wall 119b connecting the first side wall 113 and the second side wall 114 is provided over the upper surfaces of the beams 118. The upper side of the spaces between adjacent beams 118 is closed by the closing wall 119b.

The assembled battery 120 includes a plurality of laminated cells 120A each formed of laminated battery cells 121. In this embodiment, for example, one cell lamination 120A includes twenty battery cells 121, and four of such laminated cells 120A are arranged to form an assembled battery 120 (FIG. 1).

The battery cell 121 is a cuboid that is flat in the front-rear direction, and has a positive terminal 121c and a negative terminal 121d which protrude outward from an outer case 121b.

The cell lamination 120A includes laminated battery cells 121 housed in the outer case 121b. That is, the battery cells 121 are stacked so that their faces orthogonal to the flat direction face each other. The outer case 121b is a case covering each battery cell 121 but leaving the upper surface side and the lower surface side of each battery cell 121 open.

In the cell laminate 120A, the terminals with different polarities of adjacent battery cells 121 are electrically connected by a conductive member such as a bus bar. Connection of the bus bar with the electrode terminals is performed by, for example, screw fastening, welding, or the like. Therefore, the terminals disposed at both ends of each battery cell 121 electrically connected by a bus bar or the like are configured to receive electric power from the outside or discharge electric power to another electric device.

In the cell lamination 120A, the battery cells 121 are laminated such that there is a certain gap between adjacent battery cells. The sides of this gap is covered with a cover 122 provided between the battery cells 121. In addition, the cover 122 also functions as a spacer for forming the gap. For example, in the outer case 121b, the cover 122 may be formed by providing a partition wall between adjacent battery cells 121 and providing, for example, protrusions and recesses on the partition wall.

The plurality of laminated cells 120A (battery cells 121) are fixed (arranged) on the upper surfaces of the beams 118. Specifically, the lower ends of a cell lamination 120A (battery cells 121) in the direction (left-right direction) in which the beams 118 are arranged is mounted (arranged or fixed) on two beams 118, respectively.

The circulation path 130 is a path formed in the case 110 through which a fluid for heat exchange flows around the battery cells 121. The circulation path 130 mainly includes a first side wall side path 131, a second side wall side path 132, a top wall side path 133, a battery path 134, a bottom wall side path 135, and a series of flow paths connecting the blowers 140A and 140B.

The first side wall side path 131 extends perpendicularly to both the top wall 111 and the bottom wall 112 and extends parallel to the first side wall 113, and further, it is formed between the battery cells 121 (the assembled battery 120) and the first side wall 113.

The second side wall side path 132 extends perpendicularly to both the top wall 111 and the bottom wall 112 and extends parallel to the second side wall 114, and further, it is formed between the battery cells 121 (the assembled battery 120) and the second side wall 114. These first and second side wall side paths 131, 132 are paths extending along inner surfaces of the casing, and correspond to the "path along the housing" recited in the claims.

The top wall side path 133 is a path formed between the top wall 111 and the battery cells 121 (assembled battery 120) and extending parallel to the top wall 111.

The first side wall side path 131 and the top wall side path 133 are connected at the boundary between the top wall 111 and the first side wall 113. In addition, the second side wall side path 132 and the top wall side path 133 are connected at the boundary between the top wall 111 and the second side wall 114.

The battery path 134 is a path formed by the gap between adjacent battery cells 121 in each cell lamination 120A. The cover 122 shown in FIGS. 1 to 3 and FIG. 13 closes the sides of the gap between the adjacent battery cells 121. As a result, the inlet port 134a of the battery path 134 is limited to the upper side of the gap, and the fluid does not flow into the battery path 134 from the sides of the gap. Further, the outlet port 134b of the battery path 134 is limited to the lower side of the gap.

The bottom wall side path 135 is a path formed as the space surrounded by the bottom wall 112, the lower surfaces 121a of the battery cells 121, and the beams 118. In addition, the bottom wall side path 135 includes the space surrounded by the bottom wall 112, the closing wall 119a, and the beams 118, and also the space surrounded by the bottom wall 112, the closing wall 119b, and the beams 118. The bottom wall side path 135 is a path formed between adjacent beams 118 below the battery cells 121. In the present embodiment, based on the five beams 118, four paths are formed.

Of the four bottom wall side paths 135, the second path from the side of the first side wall 113 communicates with the first path via a communicating part (not shown) in the vicinity of the blower 140A. The third path from the side of the first side wall 113 communicates with the fourth path via a communicating part (not shown) in the vicinity of the blower 140B.

The inlet port 134a at the upper side of the battery path 134 is connected to the top wall side path 133 and the outlet port 134b at the lower side of the battery path 134 is connected to the bottom wall side path 135.

The blower 140 is accommodated in the case 110 and is fluid driving means for forcibly flowing (circulating) a heat exchange fluid through the circulation path 130. In the present embodiment, the blower 140 includes two blowers, i.e., the first blower 140A and the second blower 140B placed side by side. Hereinafter, the two blowers 140A and 140B may be generically referred to as a blower 140. The fluid circulated in the circulation path 130 may be, for example, air, any of various gases, water, a coolant, etc.

Figure 4:
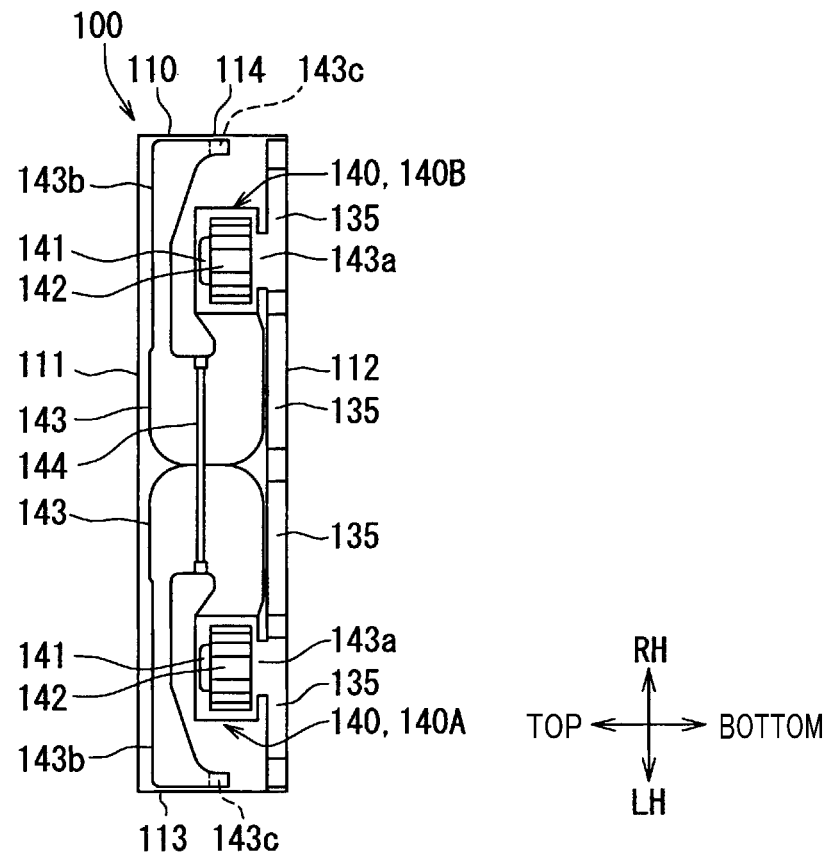
FIG. 4 is a cross-sectional view taken along the line IV-IV in FIG. 1.

As shown in FIGS. 1, 2, and 4, the first blower 140A is a blower that circulates fluid in the part of the circulation path 130 corresponding to the area of the two laminated cells 120A closer to the first side wall 113. The second blower 140B is a blower that circulates fluid in the part of the circulation path 130 corresponding to the area of the two laminated cells 120A closer to the second side wall 114. The first blower 140A and the second blower 140B are provided in the case 110 between the third side wall 115 and the laminated cells 120A (battery cells 121), such that they are symmetrical with respect to the center line extending in the front-rear direction of the case 110.

Each of the blowers 140A, 140B has a motor 141, a sirocco fan 142, and a fan casing 143.

The motor 141 is an electric device that rotationally drives the sirocco fan 142, and is provided above the sirocco fan 142.

The sirocco fan 142 is a centrifugal fan that sucks fluid in the direction of its rotation axis and blows the fluid out in centrifugal directions. The sirocco fan 142 is placed so that its rotation axis extends in the vertical direction.

The fan casing 143 is formed so as to cover the sirocco fan 142, and serves as a wind guide member for setting the directions in which the fluid is sucked in and blown out by the sirocco fan 142. The fan casing 143 has a suction port 143a which is opened at the lower side of the sirocco fan 142, a outflow duct 143b which guides the flow of the blown fluid, and a outflow port 143c which is opened at the leading end of the outflow duct 143b.

The suction port 143a of each blower 140A, 140B is positioned so as to be connected to an area of the bottom wall side path 135 near the third side wall 115. The suction port 143a of the blower 140A is connected with, among the four bottom wall side paths 135, the first and second paths from the side of the first side wall 113. The suction port 143a of the blower 140B is connected with, among the four bottom wall side paths 135, the third and fourth paths from the side of the first side wall 113.

The outflow duct 143b of each blower 140A, 140B once extends from a side surface of the sirocco fan 142 towards the center of the case 110. The outflow duct 143b then makes a U-turn and extends towards the first and second side wall side path 131 or 132.

The outflow port 143c of the blower 140A is positioned so as to be connected to the first side wall side path 131. Specifically, the outflow port 143c is located closer to the bottom in the vertical direction in the first side wall side path 131, near the battery cell 121 of the laminated battery cells 121 that is close to the third side wall 115, and so that it faces the fourth side wall 116 side.

The outflow port 143c of the blower 140B is positioned so as to be connected to the second side wall side path 132. Specifically, the outflow port 143c is located closer to the bottom in the vertical direction in the second side wall side path 132, near the battery cell 121 of the laminated battery cells 121 that is close to the third side wall 115, and so that it faces the fourth side wall 116 side.

At an intermediate position of the fan casing 143, a heating device for heating the fluid to a certain temperature is provided. The heating device may be, for example, a PTC heater 144 having a self-temperature control function.

As shown in FIG. 5, the internal fin 150 is a fin for promoting heat exchange provided inside the case 110, and it includes a first internal fin 151 and a second internal fin 152. The internal fins 151 and 152 are made of an aluminum material or an iron material having good thermal conductivity.

The first internal fin 151 is provided on the side of the first side wall 113 and the side of the second side wall 114 so as to be symmetrical with respect to the center line extending in the front-rear direction of the case 110. The second internal fin 152 is provided on the top wall 111 at two positions, i.e., on the side of the first side wall 113 and the side of the second side wall 114 so as to be symmetrical with respect to the center line extending in the front-rear direction of the case 110.

Here, for example, a straight fin which makes it possible to set the flow resistance to the fluid relatively small is adopted for each of the internal fins 151, 152. A straight fin includes a number of thin-plate shaped fin parts protruding perpendicularly from a thin plate-shaped substrate part, the fin parts are arranged so that fluid paths are formed between adjacent fin parts.

The internal fins 151 and 152 are not limited to the above-mentioned straight fin but may also be another corrugated fin (with or without louvers), an offset fin, or the like.

The substrate part of the first internal fin 151 forms an elongated right triangular shape A, B, C, and the corner A-B-C is substantially a right angle. The length of the long side A-B extending in the front-rear direction is set to be generally equal to the length of the cell lamination 120A in the lamination direction. The length of the short side B-C extending in the vertical direction is set to be somewhat smaller than the vertical dimension of the first and second side walls 113, 114. The substrate part is positioned so that its position in the front-rear direction corresponds to the position of the cell lamination 120A. The short side B-C is located on the side of the fourth side wall 116, the apex angle B-A-C opposed to the short side B-C is located on the side of the third side wall 115, and the long side A-B is located so that it extends along the upper edge of the first and second side walls 113, 114. The substrate part is attached to the inner surface of the first or second side wall 113, 114. Thus, the hypotenuse C-A of the substrate part is a side inclined downward from the third side wall 115 side toward the fourth side wall 116 side.

The fin parts of the first internal fin 151 protrudes perpendicularly from the substrate part toward the battery cells 121 side, and protruded tips extend to the vicinity of the side surfaces of the battery cells 121 so that more fluid flows inside the fin parts. The plates of the fin part are designed to be inclined toward the fourth side wall 116 from the lower side to the upper side with respect to the vertical direction. Further, the length of the fluid path provided by the fin parts increases as it gets closer to the fourth side wall 116 from the third side wall 115 side.

On the other hand, the substrate part of the second internal fin 152 forms an elongated triangular shape D, E, F. The length of the long side D-E extending in the front-rear direction is set to be generally equal to the length of the long side A-B of the substrate part of the first internal fin 151. The substrate part of the second internal fin 152 is positioned so that its position in the front-rear direction corresponds to the position of the first internal fin 151. The short side E-F is located closer to the third side wall 115, and the apex angle E-D-F opposed to the short side E-F is located closer to the fourth side wall 116. The long side D-E extends along an edge of the top wall 111 extending in the front-rear direction. The substrate part of the second internal fin 152 is attached to the inner surface of the top wall 111 so as to be adjacent to the fin parts of the first internal fin 151.

The fin parts of the second internal fin 152 protrudes perpendicularly from the substrate part toward the battery cells 121 side, and protruded tips extend to the vicinity of the upper surfaces of the battery cells 121 so that more fluid flows inside the fin parts. The plates of the fin parts are designed to be inclined toward the fourth side wall 116 as it gets closer to the center of the case 110 with respect to the left-right direction. The length of the fluid path provided by the fin parts decreases as it gets closer to the fourth side wall 116 from the third side wall 115 side. The fluid path formed by the fin parts of the second internal fin 152 is continuously connected to the fluid path formed by the fin parts of the first internal fin 151.

As shown in FIG. 6, the external fin 160 is a fin for promoting heat exchange provided outside the case 110, and it includes a first external fin 161 and a second external fin 162. The external fins 161 and 162 are made of an aluminum material or an iron material having good thermal conductivity.

The first external fin 161 is provided on the side of the first side wall 113 and the side of the second side wall 114 so as to be symmetrical with respect to the center line extending in the front-rear direction of the case 110. The second external fin 162 is provided on the top wall 111 at two positions, i.e., on the side of the first side wall 113 and the side of the second side wall 114 so as to be symmetrical with respect to the center line extending in the front-rear direction of the case 110.

Here, for example, a corrugated fin which makes it possible to set the fluid heat conductivity with respect to the fluid relatively large is adopted for each of the external fins 161, 162. A corrugated fin has a corrugated shape as a whole, and many louvers are formed on the corrugated opposing surfaces, and fluid paths are formed between corrugated opposing surfaces and between louvers.

The external fins 161 and 162 may also be a straight fin like the above-described internal fins 151, 152, a corrugated fin that does not have louvers, an offset fin, or the like.

The first external fin 161 is provided in a set of a plurality of units (two in this case). The first external fin 161 is formed at areas of the first and second side walls 113 and 114 corresponding to the first internal fin 151, in such a manner that the direction in which the wave continues is directed in the front-rear direction, and so as to be somewhat offset toward the fourth side wall 116.

The second external fin 162 is provided in a set of a plurality of units (two in this case). The second external fin 162 is formed at areas of the top wall 111 that is close to the first and second side walls 113 and 114 and corresponding to the second internal fin 152, in such a manner that the direction in which the wave continues is directed in the front-rear direction, and so as to be somewhat offset toward the third side wall 115 as compared with the first external fin 161.

Figure 7:
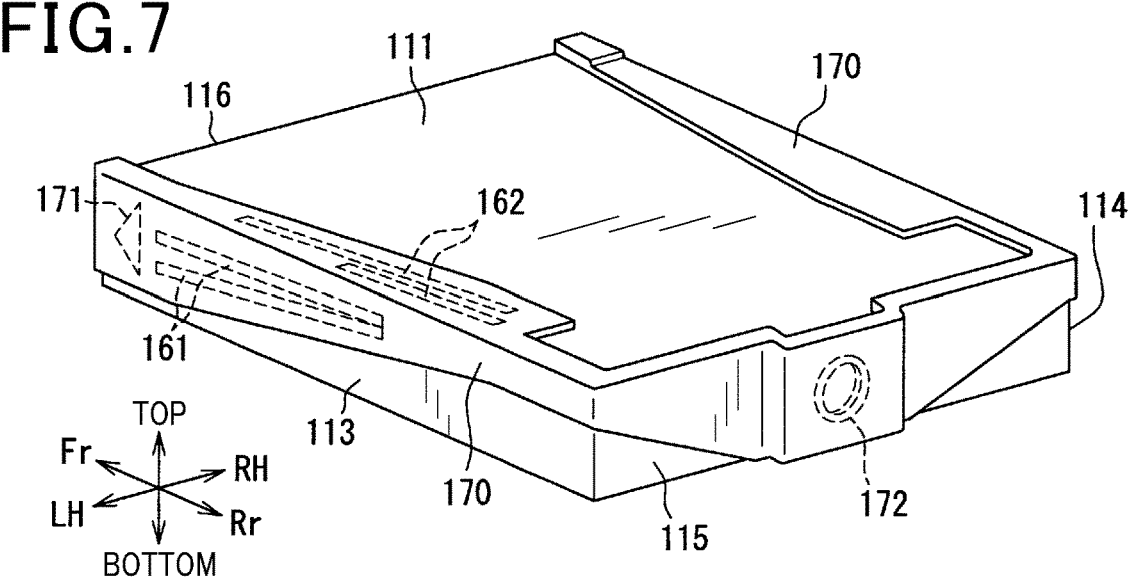
FIG. 7 is a perspective view showing an external duct.

As shown in FIG. 7 (FIG. 11), the external duct 170 is a duct for circulating the cooling fluid along the outer surface of the case 110. The cooling fluid may be, for example, cooled air in the vehicle.

The external duct 170 has a flat cross-sectional shape and is provided over the outer surface of the case 110, more specifically, the areas of the first and second side walls 113 and 114, the areas of the top wall 111 that are close to the first and second side walls 113 and 114, and the area of the third side wall 115. The external duct 170 is formed so as to enclose (cover) the external fins 161, 162. The inside of the external duct 170 is a flow path which mainly communicates in the order of the areas of the first and second side walls 113, 114, the areas of the top wall 111 that are close to the first and second side walls 113, 114, and the area of the third side wall 115.

Suction parts for sucking conditioned air are provided at the two ends (the first and second side walls 113, 114 sides) of the external duct 170 on the fourth side wall 116 side. A wind direction device 171 for splitting the sucked conditioned air to a flow heading to the lower side of the first external fin 161 and a flow heading to the center side of the case 110 of the second external fin 162 is provided on the downstream side immediately after the suction part.

A blower 172 is provided at the center of the third side wall 115 side of the external duct 170, and the upper part and the lower part of the blower 172 serve as outflow parts from which the conditioned air is blown out. The blower 172 may be, for example, a turbofan.

The operation of the battery pack 100 as described above will be described with reference to FIGS. 8 to 11.

Each battery cell 121 produces heat upon outputting where current is taken out and upon inputting where the battery cell 121 is charged. In addition, the battery cells 121 are affected by the temperature of the outside of the case 110 according to the season. The battery management unit constantly monitors the temperature of the battery cells 121 in the battery pack 100 with a temperature detector, and controls the operation of the blowers 140A and 140B, the blower 172, and the PTC heater 144 based on the temperature of the battery cells 121.

The battery management unit operates the sirocco fan 142 by applying voltage to the blowers 140A, 140B according to the temperature of the battery cells 121. Depending on the temperature of the battery cells 121, the PTC heater 144 may be operated together with the blowers 140A and 140B. Alternatively, the blower 172 may be operated together with the blowers 140A and 140B.

Figure 8:
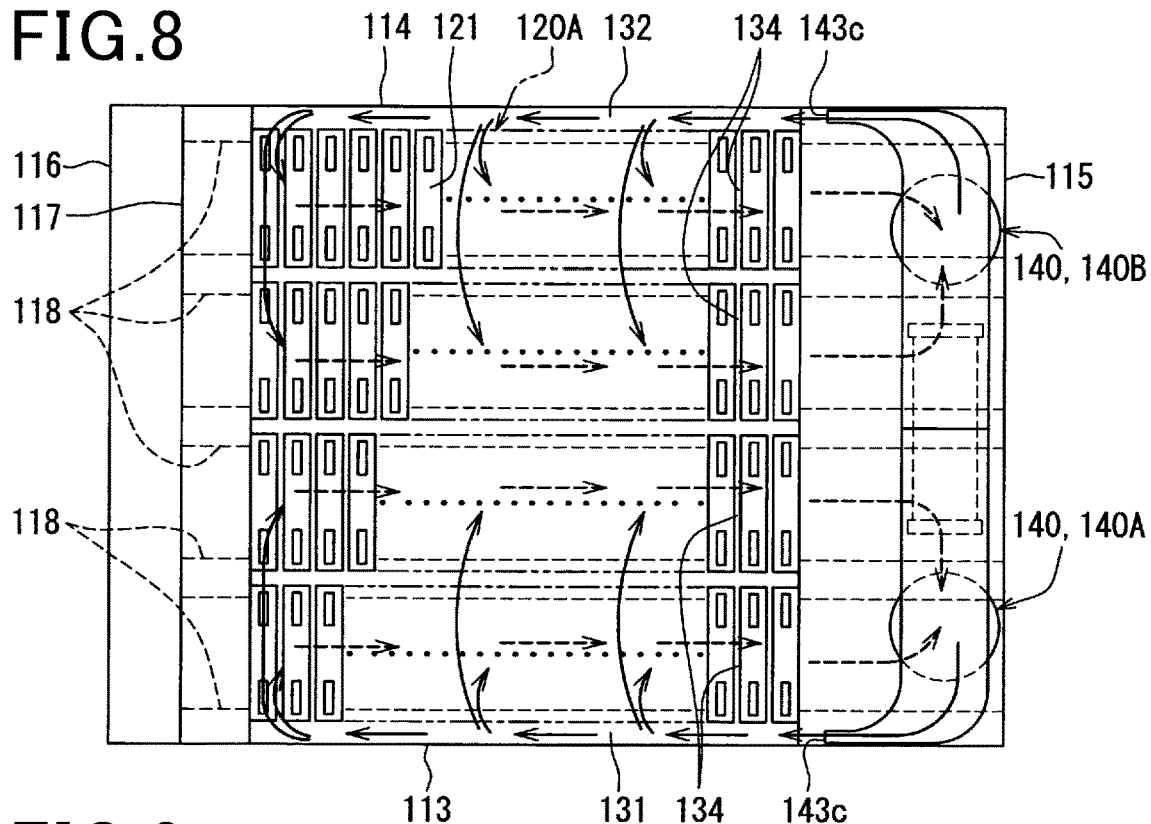
FIG. 8 is a plan view showing the flow of fluid in the case.
Figure 9:
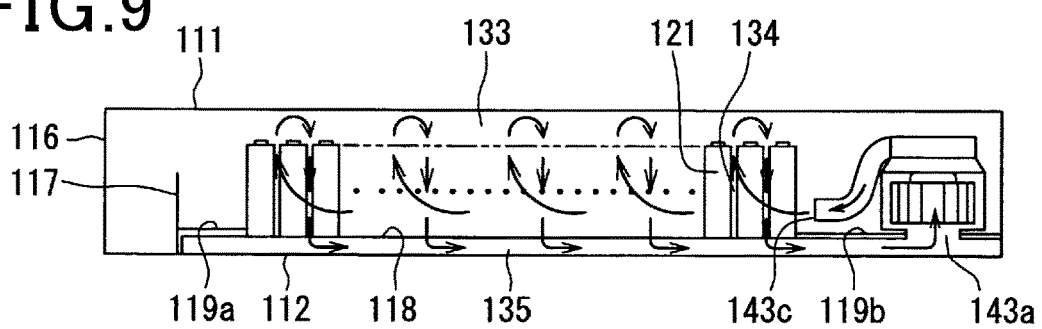
FIG. 9 is a side view showing the flow of fluid in the case.
Figure 10:
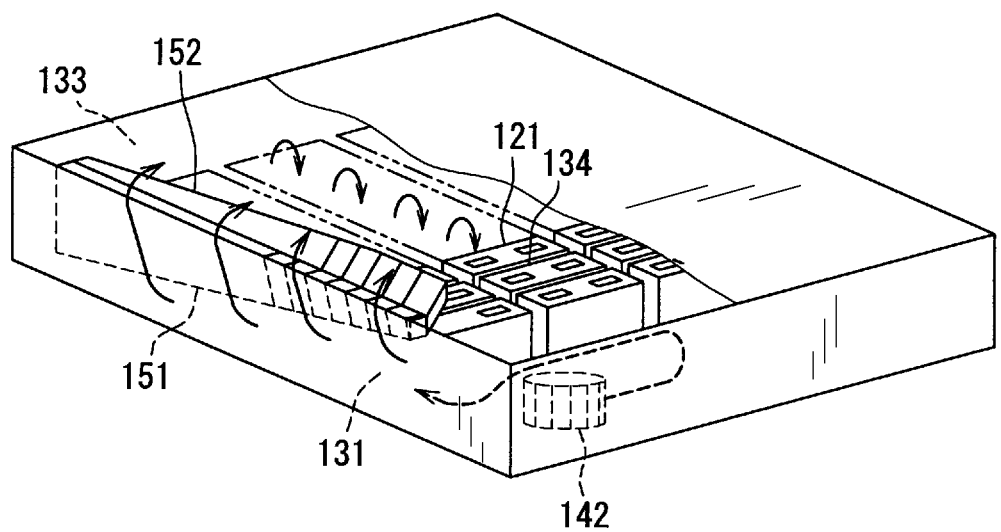
FIG. 10 is a perspective view showing the flow of fluid created by the internal fins in the case.

As described above, when only the blowers 140A and 140B are operated, the fluid inside the case 110 circulates through the circulation path 130 as shown in FIGS. 8 to 10.

That is, the fluid sucked in from the suction port 143a of each blower 140A, 140B and blown out from the outflow port 143c via the outflow duct 143b flows into the first side wall side path 131 and the second side wall side path 132, respectively.

The fluid that have flown into the first and second side wall side paths 131, 132 flows smoothly from the lower side (the bottom wall 112 side) to the upper side (the top wall 111 side) along the inclined fin parts of the first internal fin 151). Each of the first and second side wall side paths 131 and 132 is an elongated path which extends along the long side of each of the first and second side wall side paths 131 and 132 and has a flat cross section. The inlet cross-sectional area of when the fluid flows is smaller than the other parts, i.e., the top-wall side path 133, the battery path 134, and the bottom wall side path 135, so that some flow velocity of the fluid is obtained, and dynamic pressure is dominant here. Therefore, in the first and second side wall side paths 131, 132, the heat of the fluid with a flow velocity is effectively transmitted to the first internal fin 151, and further, the heat is transmitted to the outside via the first and second side walls 113, 114.

Next, the fluid smoothly flows to the fin parts of the second internal fin 152 continuously connected to the first internal fin 151, and flows along the fin parts into the top wall side path 133. When flowing into the top wall side, the inlet cross-sectional area is significantly larger than the inlet cross-sectional area when flowing into the first and second side wall side paths 131 and 132. The flow velocity of the fluid is small, and static pressure is dominant here. Therefore, the fluid that has flown into the top wall side path 133 from the sides of the first and second side wall side paths 131, 132 spreads evenly in the top wall side path 133.

As shown in FIGS. 8 and 9, the fluid that has flown into the top wall side path 133 from the first side wall side path 131 spreads mainly into the area of the two laminated cells 120A that are close to the first side wall 113. In addition, the fluid that has flown into the top wall side path 133 from the second side wall side path 132 spreads mainly into the area of the two laminated cells 120A that are close to the second side wall 114. The heat of the fluid that has flown into the top wall side path 133 is transmitted from the second internal fin 152 to the top wall 111 or is directly transmitted to the top wall 111, and is then released to the outside.

Next, the fluid that has flown into the top wall side path 133 passes through the battery paths 134 formed between the battery cells 121 and reaches the bottom wall side path 135. The first and second side wall side paths 131, 132 and the top wall side path 133 become positive pressure spaces due to the blowing by the blowers 140A, 140B. Further, the bottom wall side path 135 becomes a negative pressure space due to the suction by the blowers 140A, 140B, and the pressure difference between them causes the fluid to continuously move from the top wall side path 133 side to the bottom wall side path 135 side. When the fluid passes through the battery path 134, the heat of each battery cell 121 is transferred to the fluid.

Next, the fluid that has flown into the bottom wall side path 135 moves along the longitudinal direction of the beams 118 and reaches the suction port 143a of each blower 140A, 140B. The heat of the fluid that has flown into the bottom wall side path 135 is transferred to the bottom wall 112 and is then released to the outside.

Note that the circulation path 130 is formed such that the entire amount of the fluid blown out from the blowers 140A and 140B flows from the first and second side wall side paths 131 and 132 to the top wall side path 133, then to the battery path 134, and finally to the bottom wall side path 135. That is, the circulation path 130 is formed such that the fluid would not bypass these paths.

As described above, as a result of the circulation of the fluid through the circulation path 130 in the case 110, the heat of the fluid, that is, the heat of the battery cells 121 is released to the outside mainly from the top wall 111 and the bottom wall 112 having large areas. At this point, heat exchange is promoted by the internal fins 151, 152. Thus, each battery cell 121 is adjusted to an appropriate temperature.

Further, as described above, when the temperature of the battery cells 121 is low, the PTC heater 144 is operated in addition to the blowers 140A and 140B. Then, the fluid flowing through the outflow duct 143b is heated by the PTC heater 144. As the heated fluid circulates through the circulation path 130 in the case 110 as described above, on the contrary, the temperature of each battery cell 121 is raised by the heated fluid to a temperature at which it can be properly operate, and the performance deterioration at low temperature can be corrected.

Further, as described above, when the temperature of the battery cells 121 is high, the blower 172 in the external duct 170 is operated in addition to the blowers 140A and 140B. In this case, the cooled air from the air conditioner in the vehicle is sucked into the external duct 170 from the suction port of the external duct 170.

Figure 11:
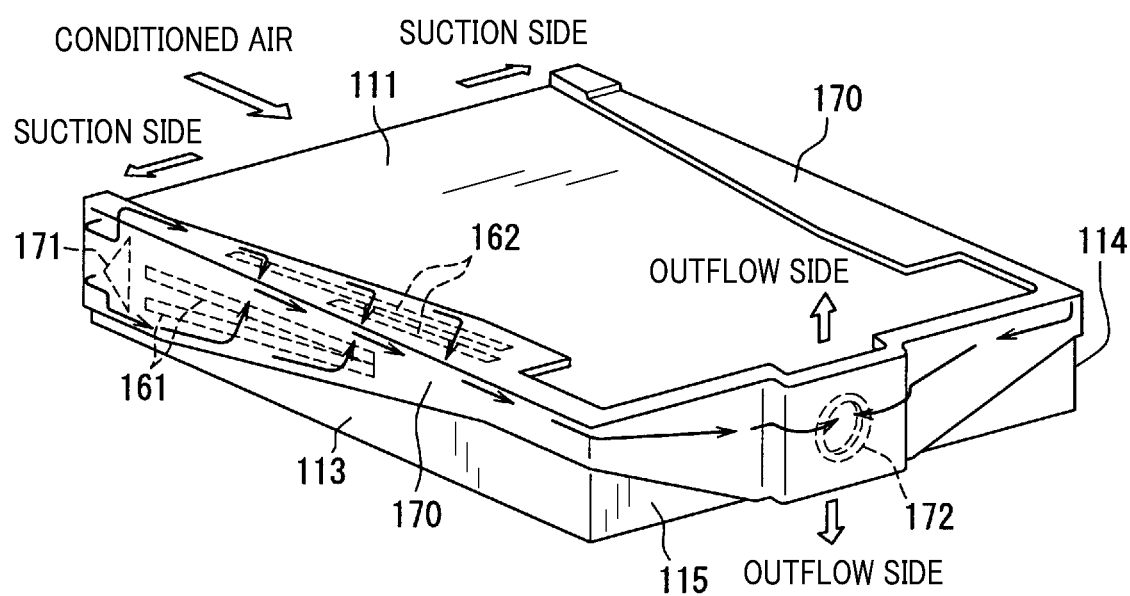
FIG. 11 is a perspective view showing the flow of cooling fluid in the external duct.

As shown in FIG. 11, the conditioned air sucked from the suction port is divided by the wind direction device 171 into a flow toward the lower side of the first external fin 161 and a flow toward the center side of the case 110 of the second external fin 162. Then, the flows pass across the external fins 161, 162, respectively, and after merging together, the flow is blown out from the outflow parts provided at the upper and lower parts of the blower 172.

At this time, the heat of the fluid in the case 110 is transmitted to the conditioned air via the internal fins 151, 152, the first and second side walls 113, 114, the top wall 111, and the external fins 161, 162 to be released to the outside. Thus, the heat exchange of the heat of the fluid in the case 110 is further promoted by the external fins 161, 162 in addition to the internal fins 151, 152. Each battery cell 121 is forcibly cooled to an appropriate temperature in a short time.

The path cross-sectional area of the circulation path 130 of the battery pack 100 as described above will be described with reference to FIGS. 5 to 12.

As shown in FIG. 5, the first and second side wall side paths 131, 132 are divided into fin regions 131a, 132a in which the first internal fin 151 is disposed and finless regions 131b, 132b in which the first internal fin 151 is not disposed. The finless regions 131b and 132b are positioned upstream of the fin regions 131a and 132a. The fluid that has flown into the first and second side wall side paths 131, 132 flows horizontally in the finless regions 131b, 132b and then flows into the fin inlets 151a which are the inlet ports of the fin areas 131a, 132a.

The lower end of the hypotenuse C-A and the bottom wall 112 shown in FIG. 5 are closed. Specifically, the lower end of the hypotenuse C-A is brought into contact with the bottom wall 112. Alternatively, a packing is disposed between the lower end of the hypotenuse C-A and the bottom wall 112. Thus, it is possible to prevent the fluid that has flown into the finless regions 131b, 132b from leaking from the space between the lower end of the hypotenuse C-A and the bottom wall 112 without passing through the fin regions 131a, 132a.

Figure 12:
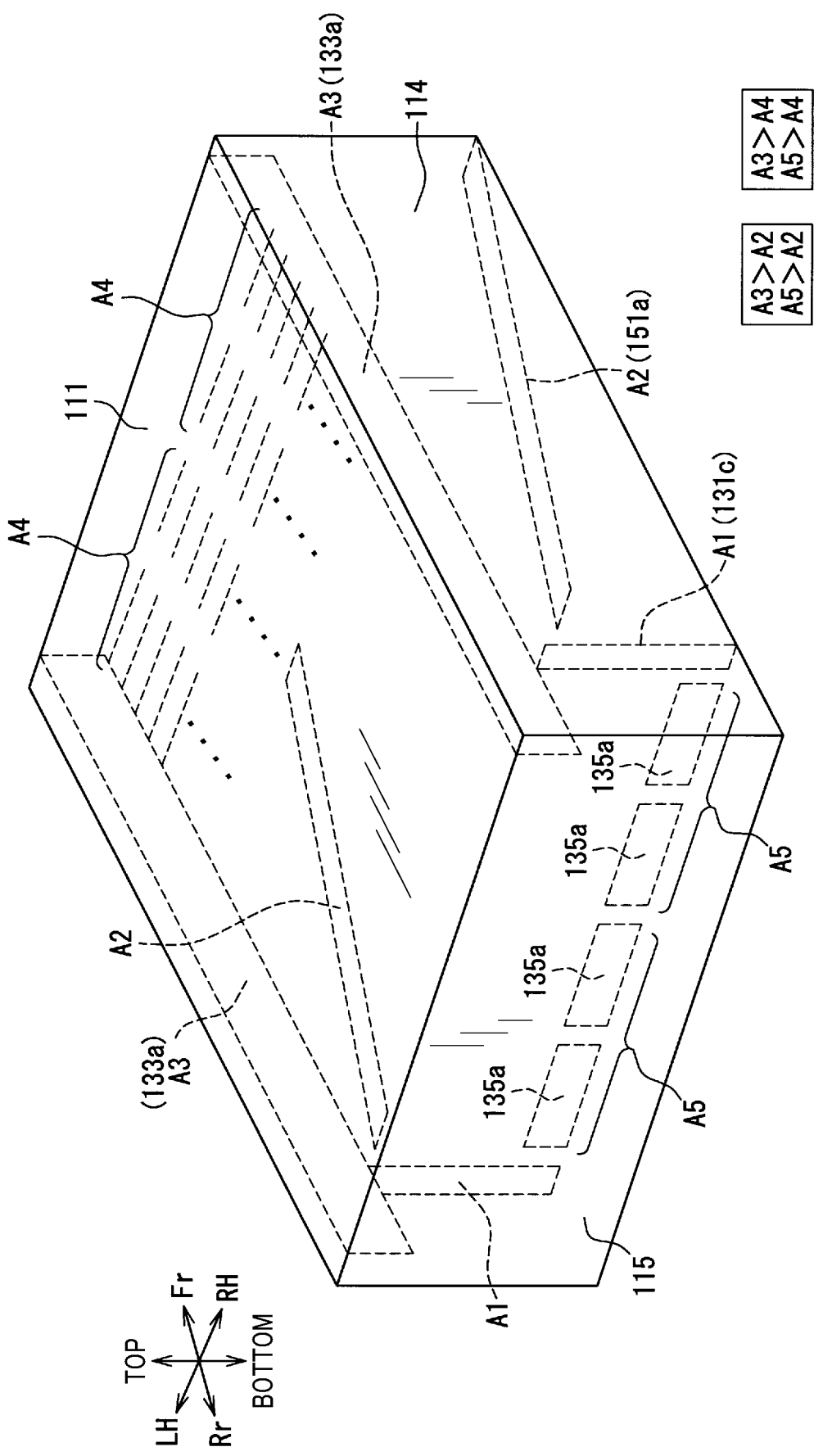
FIG. 12 is a perspective view showing the path cross-sectional areas of side wall side paths, a top wall side path, battery paths, and a bottom wall side path according to the first embodiment.

FIG. 12 schematically shows the path cross-sectional areas A1 to A5 of the circulation path 130. A "path cross-sectional area" herein indicates the area in the direction perpendicular to the flow direction of the fluid in the corresponding path. The part of the first and second side wall side paths 131, 132 where the path cross-sectional area becomes the maximum is the fin inlets 151a. The path cross-sectional area A2 at the fin inlets 151a according to the present embodiment is the area of the parts of the first and second side wall side paths 131 and 132 where the path cross-sectional area is the maximum, and it corresponds to a "pass cross-sectional area of the side wall side path". As described above, the circulation path 130 is a path in which the fluid flows symmetrically and in parallel, each flow being allotted to one of the two blowers 140A and 140B. In the following description, the path cross-sectional area of the circulation path assigned to the blower 140A will be described.

The path cross-sectional area A2 which is the area of the fin inlet 151a is larger than the path cross-sectional area A1 of the finless region 131b which is the area of the finless area 131b as seen horizontally along the first and second side walls 113, 114.

The fluid that has flown from the fin inlets 151a into the fin regions 131a, 132a is redirected so as to flow upwards by the first internal fins 151, 151, and flows into the top wall side inlets 133a which are the inlet of the top wall side path 133. In other words, the top wall side inlets 133a correspond to communication ports communicating with the first and second side wall side paths 131, 132 in the inflow side space Sin. The path cross-sectional area A3 at the top wall side inlets 133a is larger than the path cross-sectional area A2 at the fin inlets 151a.

The fluid that has flown from the top wall side inlets 133a to the top wall side path 133 is redirected so as to flow downward and is distributed to the battery paths 134. The path cross-sectional area A4 which is the sum of the path cross-sectional areas of the battery paths 134 is smaller than the path cross-sectional area A3 at the top wall side inlets 133a. Specifically, the sum of the path cross-sectional areas of the battery paths 134 formed by the battery cells 121 in two of the four rows of battery cells 121 corresponds to the above-mentioned path cross-sectional area A4, and it corresponds to a "path cross-sectional area of the battery path".

The flows of fluid flowing out from the battery paths 134 are gathered by the bottom wall side path 135. After all of the fluid flows from the battery paths 134 have been gathered, the gathered fluid flows out from the bottom wall side outlet 135a, which is the outlet from the bottom wall side path 135, and is then sucked through the suction port 143a. The path cross-sectional area A5 which is the sum of the path cross-sectional areas of the bottom wall side paths 135 is smaller than the path cross-sectional area A2 at the fin inlets 151a. Specifically, the sum of the path cross-sectional areas of the bottom wall side outlets 135a of two of the four rows of bottom wall side paths 135 corresponds to the above-mentioned path cross-sectional area A5, and it corresponds to a "path cross-sectional area of the bottom wall side outlet". The path cross-sectional area A5 is larger than the path cross-sectional area A4 of the battery path 134.

As described above, according to the battery pack 100 of the present embodiment, the battery cells 121, the circulation path 130, and the blowers 140A and 140B are provided in the case 110. Further, thanks to the PTC heater 144 and the internal fins 151, 152, it is possible to appropriately heat or control the temperature of each battery cell 121 according to the temperature of the battery cells 121 without leaking the operation noise of the blowers 140A, 140B to the interior of the vehicle. Furthermore, thanks to the external fins 161, 162 and the external duct 170 (blower 172), it is also possible to perform forcible cooling when the temperature is high.

Next, with reference to FIG. 13, description will be given of the flow speed of the fluid according to the above-described setting of the path cross-sectional areas A1 to A5. The smaller the path cross-sectional areas A1 to A5, the faster the flow velocity. Thus, the magnitude relation of the flow velocity is determined in accordance with the magnitude relation such as A3>A2, A5>A2, A3>A4, A5>A4.

For example, due to the magnitude relation of A3>A2 and A3>A4, the velocity of the fluid flowing from the top wall side inlet 133a into the top wall side path 133 is slower than the velocity of the fluid flowing from the fin inlet 151a into the fin region 131a and the velocity in the battery path 134. For example, due to the magnitude relation of A5>A2 and A5>A4, the velocity of the fluid flowing out from the bottom wall side outlet 135a is slower than the velocity of the fluid flowing into the fin region 131a and the velocity in the battery path 134.

Figure 13:
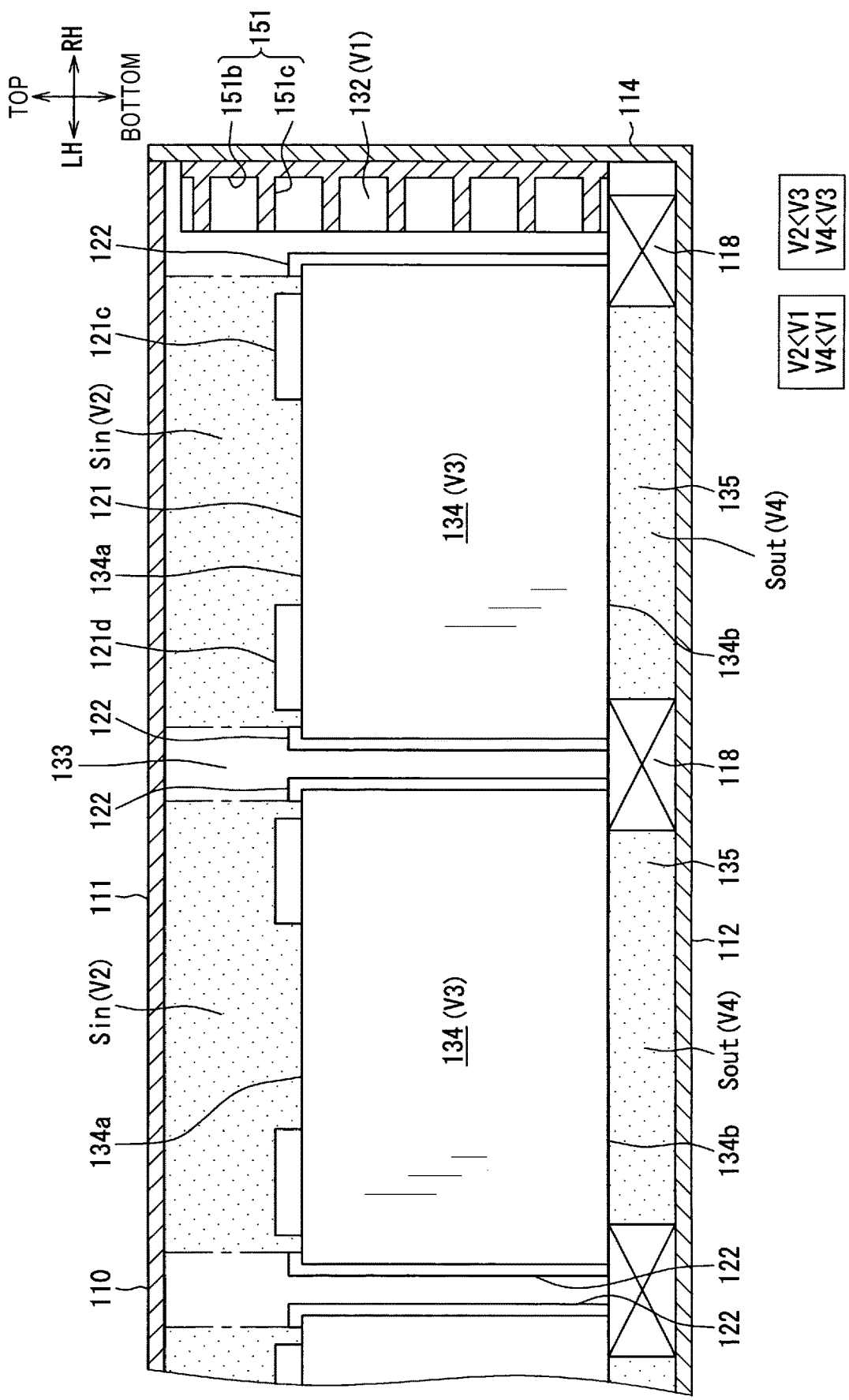
FIG. 13 is a cross-sectional view showing an inflow side space and an outflow side space according to the first embodiment.

The spaces in the top wall side path 133 facing the inlets 134a of the battery paths 134 and indicated with dotted areas in FIG. 13 correspond to the "inflow side space Sin" recited in the claims. More specifically, the battery path 134 has a form extending in the vertical direction (the short side direction of the case 110), formed by a space surrounded by the opposing faces of adjacent battery cells 121 and a pair of covers 122 facing each other. The space surrounded by the imaginary planes (see the one-dot chain line in FIG. 13) obtained by extending the inlet 134a in the direction in which the battery path 134 extends (the vertical direction), and the top wall 111 corresponds to the inflow side space Sin in the top wall side path 133. In other words, a region of the top wall side path 133 overlapping with the inlet 134a when viewed from the direction in which the battery path 134 extends corresponds to the inflow side space Sin. The inflow side space Sin allows the fluid in the top wall side path 133 to be distributed to the inlets 134a.

The spaces in the bottom wall side path 135 facing the outlets 134b of the battery paths 134 and indicated with dotted areas in FIG. 13 correspond to the "outflow side space Sout" recited in the claims. More specifically, the space surrounded by the imaginary planes (not illustrated) obtained by extending the outlet 134b in the direction in which the battery path 134 extends (the vertical direction), and the bottom wall 112 corresponds to the outflow side space Sout in the bottom wall side path 135. In other words, a region of the bottom wall side path 135 overlapping with the outlet 134b when viewed from the direction in which the battery path 134 extends corresponds to the outflow side space Sout. The outflow side space Sout allows the fluid in the bottom wall side path 135 to be gathered from the outlets 134b.

Reference symbol V1 in FIG. 13 indicates the flow velocity V1 of the fluid in the first and second side wall side paths 131, 132. For example, the flow velocity measured at an arbitrary point of the first and second side wall side paths 131, 132 is the flow velocity V1. Alternatively, the average of the flow velocities measured at multiple points of the first and second side wall side paths 131, 132 may be the flow velocity V1. Alternatively, the maximum value or the minimum value of the flow velocities measured at multiple points may be the flow velocity V1. Alternatively, the flow velocity measured at the fin inlet 151a of the first and second side wall side paths 131, 132 is the flow velocity V1. Alternatively, the flow velocity in the finless region 131b or the fin region 131a of the first and second side wall side paths 131, 132 is the flow velocity V1.

Reference symbol V2 in FIG. 13 indicates the flow velocity V2 of the fluid in the inflow side space Sin. For example, the flow velocity measured at an arbitrary point of the inflow side space Sin is the flow velocity V2. Alternatively, the average of the flow velocities measured at multiple points of the inflow side space Sin is the flow velocity V2. Alternatively, the maximum value or the minimum value of the flow velocities measured at multiple points of the inflow side space Sin may be the flow velocity V2.

Reference symbol V3 in FIG. 13 indicates the flow velocity V3 of the fluid in the battery path 134. For example, the flow velocity measured at an arbitrary point of the battery path 134 is the flow velocity V3. Alternatively, the average of the flow velocities measured at multiple points of the battery path 134 is the flow velocity V3. Alternatively, the maximum value or the minimum value of the flow velocities measured at multiple points of the battery path 134 may be the flow velocity V3.

Reference symbol V4 in FIG. 13 indicates the flow velocity V4 of the fluid in the outflow side space Sout. For example, the flow velocity measured at an arbitrary point of the outflow side space Sout is the flow velocity V4. Alternatively, the average of the flow velocities measured at multiple points of the outflow side space Sout is the flow velocity V4. Alternatively, the maximum value or the minimum value of the flow velocities measured at multiple points of the outflow side space Sout may be the flow velocity V4.

In the present embodiment, the path cross-sectional area A3 of the top wall side inlet 133a is set to be larger than the path cross-sectional area A2 of the first and second side wall side paths 131, 132. Thus, the flow velocity V2 of the fluid in the inflow side space Sin is reduced as compared with the flow velocity V1 of the fluid in the first and second side wall side paths 131, 132. This means that the pressure energy increases by an amount corresponding to the decrease in the flow velocity energy. The increase in the pressure energy means that the fluid becomes statically pressurized and the flow distribution becomes more uniform. Therefore, according to the present embodiment, regarding the distribution of the fluid in the top wall side path 133 to the battery paths 134, the variation in the distribution, that is, the variation in the distribution of the inflow amount is reduced. Thus, since variation in the heat radiation amount from each battery cell 121 can be reduced, the temperature distribution variation of the battery cell 121 can be reduced, and as a result, it is possible to aid the entire battery pack 100 to fully exert its charging and discharging performance.

Further, in the present embodiment, the path cross-sectional area A5 of the bottom wall side outlet 135a is set to be larger than the path cross-sectional area A2 of the first and second side wall side paths 131, 132. Thus, the flow velocity V4 of the fluid in the outflow side space Sout is reduced as compared with the flow velocity V1 of the fluid in the first and second side wall side paths 131, 132. This means that the pressure energy increases by an amount corresponding to the decrease in the flow velocity energy, and that the fluid becomes statically pressurized and the flow distribution becomes more uniform. Therefore, according to the present embodiment, regarding the gathering of the fluid flowing out from the battery paths 134 in the bottom wall side path 135, the variation in the distribution of the amount of outflow from the battery paths 134 is reduced. Thus, since variation in the heat radiation amount from each battery cell 121 can be reduced, the temperature distribution variation of the battery cell 121 can be reduced, and as a result, it is possible to aid the entire battery pack 100 to fully exert its charging and discharging performance.

Paraphrasing the above-described magnitude relation of the path cross-sectional areas A2, A3, A5, it can be also expressed that the cross sectional area A2 of the first and second side wall side paths 131, 132 is set to be smaller than the other path cross-sectional areas A3, A5. Therefore, the flow velocity energy of the fluid in the first and second side wall side paths 131, 132 increases by an amount corresponding to the decrease in the pressure energy, and the flow velocity increases as compared with the fluid in the top wall side path 133 and the bottom wall side path 135. That is, the flow velocity V1 is faster than the flow velocities V2, V3. Therefore, the heat transfer coefficient of when the heat of the fluid moves to the case 110 can be increased, and the amount of heat dissipated from the case 110 to the external air can be increased.

In the first and second side wall side paths 131, 132, the variation in the flow velocity distribution increases due to the increase in the flow velocity energy, but as described above, the fluid becomes statically pressurized in the top wall side path 133 (inflow side space Sin). Thus, according to the present embodiment, it is possible to achieve both the temperature distribution variation of the battery cells 121 due to the variation in the distribution to the battery paths 134 and the increase in the amount of heat radiation in the first and second side wall side paths 131, 132.

Further, in the present embodiment, the first and second side walls 113, 114 are provided with the first internal fins 151 that exchange heat with the fluid flowing through the first and second side wall side paths 131, 132. Thus, the heat radiation amount can be further increased. In particular, since the flow velocity is increased in the first and second side wall side paths 131, 132, the effect of increasing the heat radiation amount exerted by providing the first inner fins 151 is remarkable.

In addition, the first inner fins 151 are arranged so as to guide the flow direction of the fluid that has flown horizontally into the first and second side wall side paths 131, 132 to the top wall side path 133. Specifically, as shown in FIG. 5, the first inner fin 151 is arranged in an inclined manner. Thus, the first internal fins 151 for increasing the heat radiation amount can be used to redirect the flow of the fluid, and both an increase in the heat radiation amount and redirection can be achieved.

Further, in the present embodiment, a straight fin extending linearly is adopted for the first inner fin 151. Therefore, it is possible to reduce the fluid resistance as compared with the case where another fin such as a corrugated fin is adopted. Thus, the aim of increasing the flow velocity in the first and second side wall side paths 131, 132 by reducing the path cross-sectional area A2 will not be inhibited by the first internal fin 151. In addition, it is possible to reduce the fluid resistance exerted when the flow of the fluid is redirected by adopting a straight fin.

When, contrary to the present embodiment, the plurality of first internal fins 151 are horizontally arranged instead of an inclined arrangement, the area of the fin inlet will be generally equal to the path cross-sectional area A1. Since the area of the fin inlet is then smaller than that of the fin inlet 151a according to the present embodiment, the number of the first internal fins 151 needs be decreased. In addition, at the upstream parts of the first internal fins 151, high temperature fluid exchanges heat with the first internal fins 151, whereas, at the downstream parts of the first internal fins 151, low temperature fluid exchanges heat with the first internal fins 151. Thus, at the downstream parts of the first internal fins 151, the temperature difference between the outside air temperature and the fluid temperature becomes small, and the heat exchange efficiency deteriorates. In view of this point, in the case of the horizontal arrangement, since the length of the first internal fins 151 is longer than that in the case of the inclined arrangement, the region with poor heat exchange efficiency increases.

According to the present embodiment which takes into consideration these points, the first and second side wall side paths 131, 132 are divided into fin regions 131a, 132a in which the first internal fins 151 are disposed and finless regions 131b, 132b located upstream of the fin regions 131a, 132a. The path cross-sectional area A2, which is the area of the fin inlets 151a through which the fluid flows into the fin regions 131a, 132a, is larger than the path cross-sectional area A1, which is the area of the finless inlets 131c through which the fluid flows into the finless regions 131b, 132b. Therefore, as compared with the case where the first inner fins 151 are horizontally arranged as described above, the length of the first internal fins 151 can be shortened and the number of the first internal fins 151 can be increased. Thus, because the length of the first internal fins 151 can be shortened, it is possible to reduce the region having poor heat exchange efficiency, and the increased number of fins can compensate for the decrease in the heat radiation area per one first internal fin 151 resulting from the shortening of the length. Accordingly, the amount of heat dissipation can be increased as compared with the case of horizontal arrangement. The path cross-sectional area A1 is the path cross-sectional area of when the finless regions 131b, 132b are shown in the inflow direction (horizontal direction) in which the fluid flows into the finless regions 131b, 132b.

Since the first and second side walls 113, 114 are rectangular, when the fin parts of the first internal fin 151 are arranged in an inclined manner as described above, the lengths of the fin parts differ greatly. Then, the temperature of the fluid flowing out from the first internal fin 151 varies depending on which fin part it passed.

In this embodiment which takes into consideration this point, the more the part is a part of the second internal fin 152 where the fluid flows in from the downstream part of the first side wall side path 131, the shorter the length of the fin part of the second inner fin 152. In other words, the longer the fin part of the first internal fin 151, the shorter the corresponding fin part of the second internal fin 152. Therefore, it is possible to suppress the variation in the total length of the fin parts of the first internal fin 151 and the second internal fin 152. Thus, temperature variation in the fluid flowing into the battery paths 134 can be suppressed.

Second Embodiment

Figure 14:
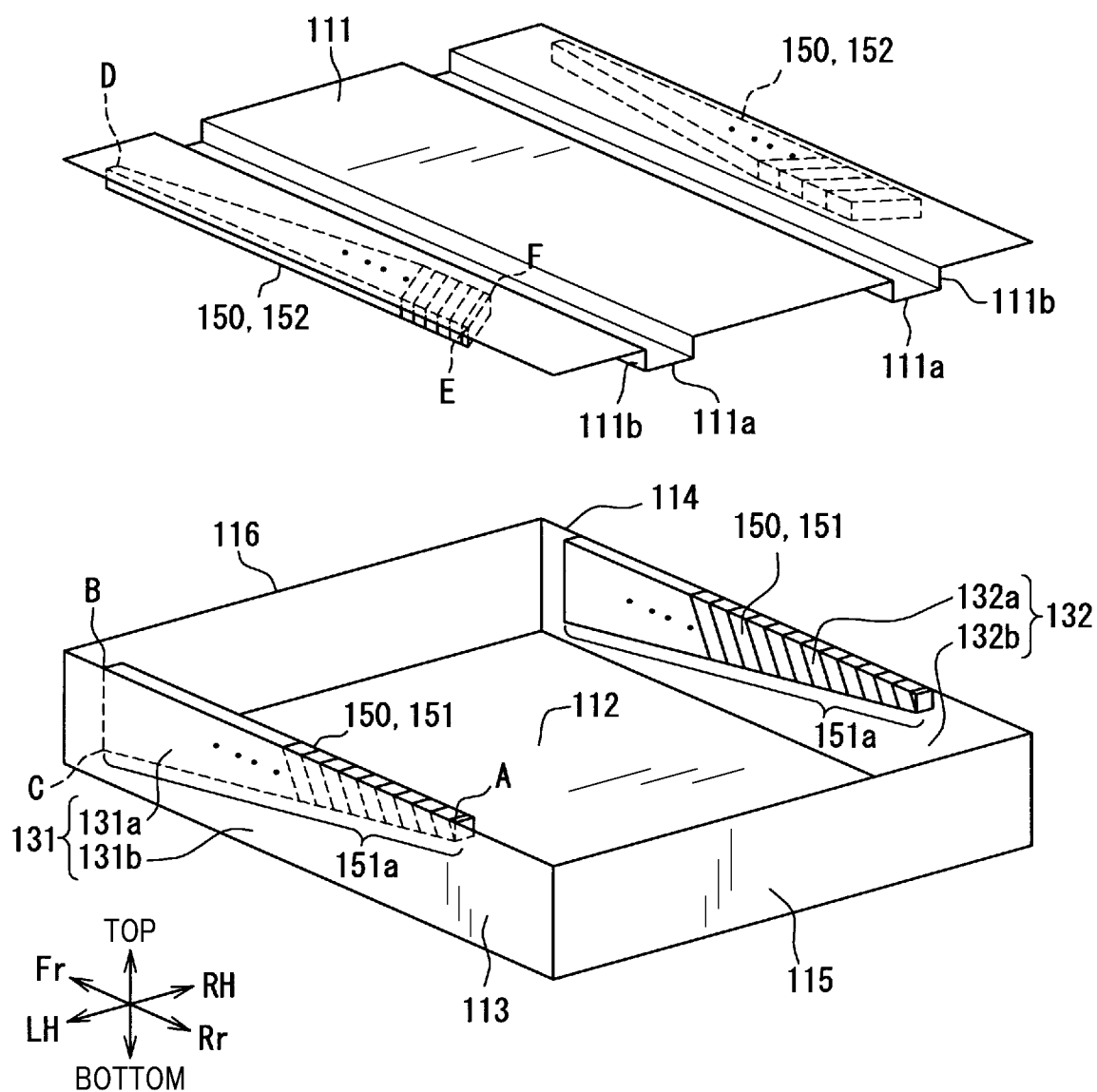
FIG. 14 is an exploded perspective view illustrating a housing which the battery pack according to a second embodiment of the present invention includes.

In the first embodiment, the top wall 111 has a flat plate-like shape. On the other hand, in the present embodiment shown in FIG. 14, the top wall 111 is provided with protruded parts 111a protruding toward the top wall side path 133. Each protruding part 111a extends in the longitudinal direction (front-rear direction) of the first and second side wall side paths 131, 132, and extends along the top wall 111 so as to face the entire top wall side inlet 133a in the longitudinal direction. In other words, the longitudinal dimension of the protruding part 111a is set to be equal to or greater than the longitudinal dimension of the top wall side inlet 133a. In the example shown in FIG. 14, the protruding part 111a is set to extend over the entire front-rear direction of the top wall 111, and one end of the protruding part 111a is in contact with the third side wall 115, and the other end is in contact with the fourth side wall 116.

The top wall 111 is formed of a plate material, and the protruding parts 111a are formed by bending the plate material. Specifically, the protruding parts 111a are formed in a shape having a face parallel to the bottom wall 112 and faces parallel to the first and second side walls 113, 114. A plurality of protruding parts 111a are provided, and the plurality of protruding parts 111a are arranged in parallel. In the present embodiment, the number of the protruding parts 111a is two.

As described above, in the present embodiment, the top wall 111 is provided with the protruded parts 111a protruding toward the top wall side path 133. According to this, the fluid that has flown from the top wall side inlet 133a into the top wall side path 133 collides with the protruding parts 111a and its speed decreases. Thus, regarding the distribution of the fluid in the top wall side path 133 to the battery paths 134, the variation in the distribution is reduced.

Further, in the present embodiment, the protruding part 111a extends along the top wall 111 so as to face the top wall side inlet 133a (communication port). Specifically, it faces the entire top wall side inlet 133a in the longitudinal direction. Therefore, the velocity reduction can be promoted, and the protruding parts 111a serve as reinforcing members for improving the strength of the top wall 111. In addition, in the present embodiment, since the ends of each protruding part 111a are in contact with the third and fourth side walls 115, 116, their function as reinforcing members can be improved.

Third Embodiment

Figure 15:
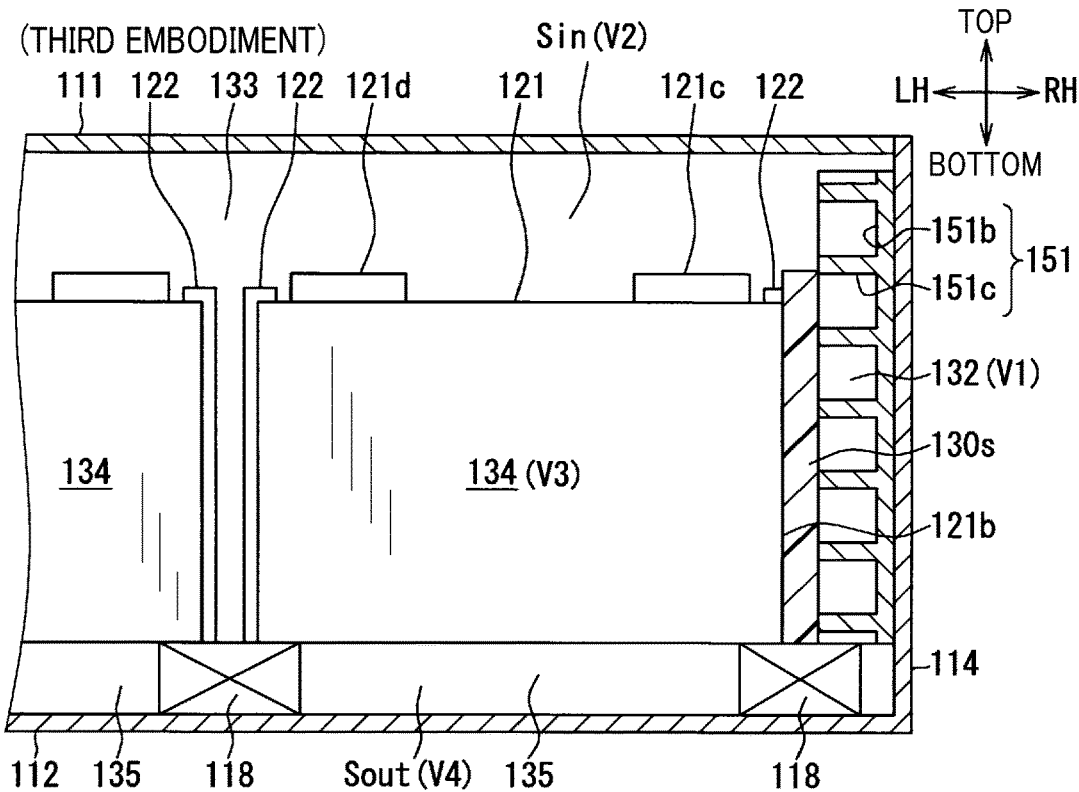
FIG. 15 is a cross-sectional view illustrating first internal fins which the battery pack according to a third embodiment of the present invention includes.

In the first embodiment, a gap is formed between the tip of the fin part of the first internal fin 151 and the outer case 121b of the battery cell 121. On the other hand, in the present embodiment, as shown in FIG. 15, a sealant 130s is disposed in the gap.

More specifically, the first internal fin 151 has a substrate part 151b and fin parts 151c similarly to that of the first embodiment. The substrate parts 151b are attached in close contact with the first and second side walls 113, 114. The fin parts 151c protrude from the substrate parts 151b toward the first and second side wall side paths 131, 132. An elastically deformable sealant 130s is disposed between the tip of the fin parts 151c and the outer case 121b of the battery cell 121. The sealant 130s is placed in a state that is elastically deformed in the compression direction, and seals the gap between the tips of the fin parts and the outer case 121b.

As described above, the fin inlets 151a, which are the inlets of the fin regions 131a, 132a, correspond to the "path cross-sectional area A2 of the first and second side wall side paths 131, 132". Strictly speaking, the fin inlets 151a according to the first embodiment include the above-described gap in addition to the inlets of the first internal fins 151. On the other hand, in the present embodiment, since the gap does not exist due to the sealant 130s, the fin inlets 151a coincide with the inlets of the first internal fins 151.

Thus, according to the present embodiment, since the gap between the first internal fins 151 and the battery cells 121 are sealed by the sealant 130s, it is possible to prevent the fluid flowing into the top wall side inlets 133a without exchanging heat with the first internal fins 151. Therefore, the amount of heat dissipation from the case 110 to the external air can be increased.

Fourth Embodiment

Figure 16:
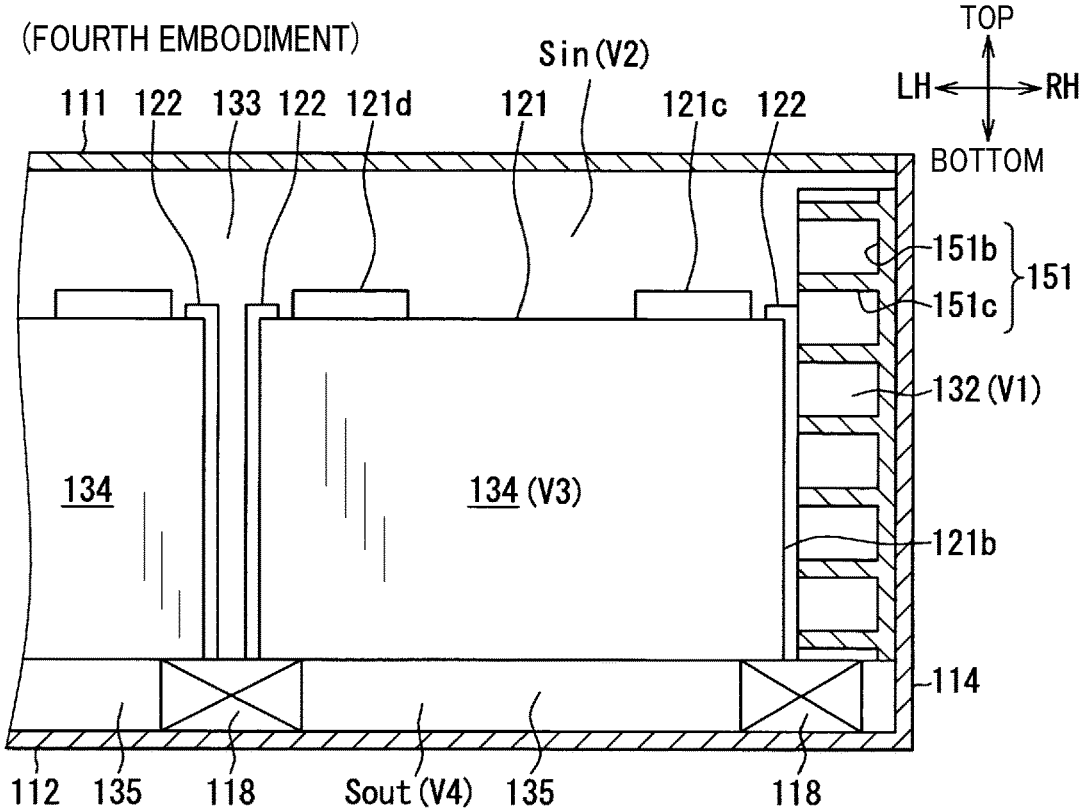
FIG. 16 is a cross-sectional view illustrating first internal fins which the battery pack according to a fourth embodiment of the present invention includes.

In the third embodiment, the gaps between the first internal fins 151 and the battery cells 121 are filled with the sealants 130s. On the other hand, in the present embodiment, as shown in FIG. 16, the tips of the fin parts 151c are brought into contact with the cover 122 to reduce the gap. Thus, also in the present embodiment, as in the third embodiment, the fin inlets 151a coincide with the inlets of the first internal fins 151.

Thus, according to the present embodiment, since the gaps between the first internal fins 151 and the battery cells 121 are filled, it is possible to prevent the fluid flowing into the top wall side inlets 133a without exchanging heat with the first internal fins 151. Therefore, the amount of heat dissipation from the case 110 to the external air can be increased.

Fifth Embodiment

Figure 17:
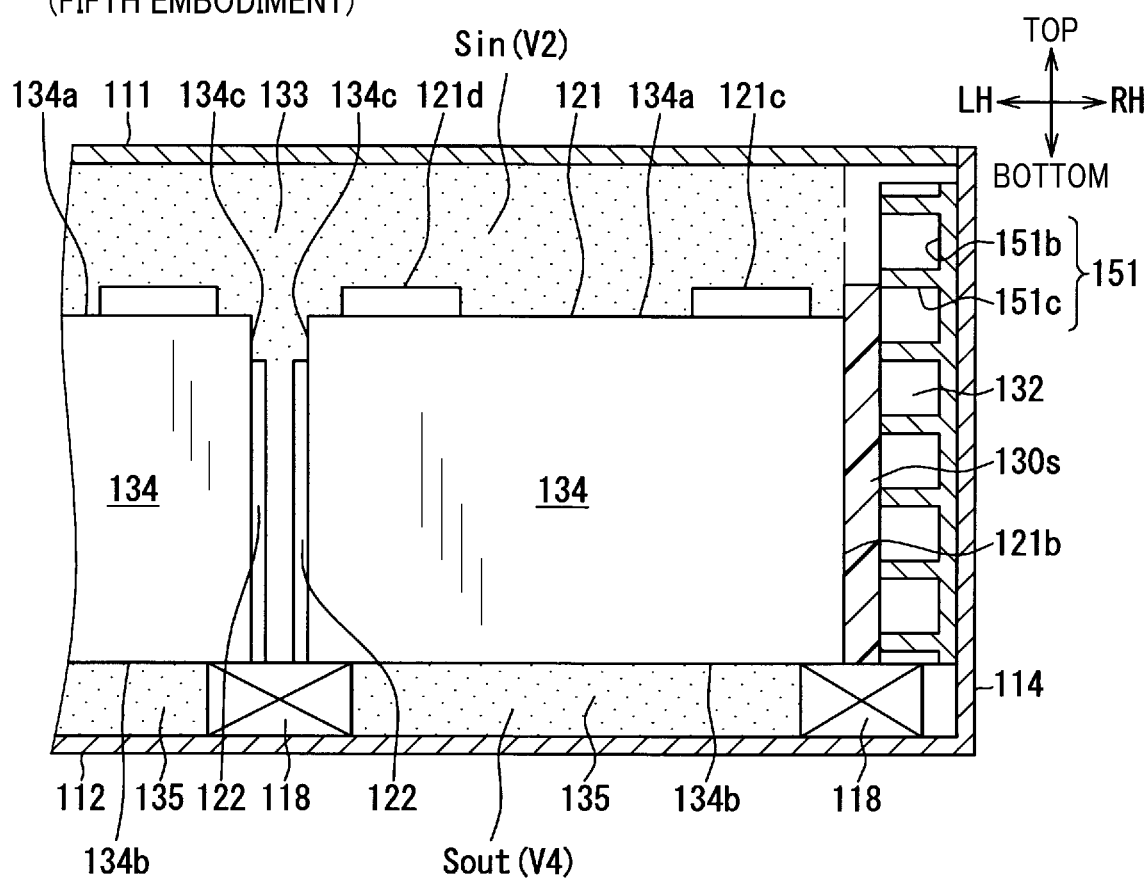
FIG. 17 is a cross-sectional view showing an inflow side space and an outflow side space according to a fifth embodiment of the present invention.

In the first embodiment, the entire lateral sides of the gap between adjacent battery cells 121 are closed with the cover 122. The inlet 134a of the battery path 134 is thereby limited to the upper side of the gap. On the other hand, in the present embodiment, as shown in FIG. 17, only the lower part of lateral sides of the gap is covered leaving the upper part open. Thus, the inlets of the battery paths 134 include the inlets 134c positioned at the lateral sides in addition to the inlets 134a on the upper sides of the gaps.

Therefore, the inflow side space Sin according to the present embodiment has a shape obtained by enlarging the inflow side space Sin according to the first embodiment laterally (see the dotted region in FIG. 17).

As described above, in the present embodiment, the shape of the inflow side space Sin is changed in accordance with the change of the inlets 134c, but the circulation path 130 is formed such that the magnitude relation of the flow velocities such as V2<V1, V4<V1, V2<V3, V4<V3 is the same as in the first embodiment. Thus, the effects of the first embodiment are similarly exhibited by the present embodiment.

Other Embodiments

In the above-described embodiments, preferred embodiments of the present invention have been described. However, the present invention is not limited to the above-described embodiments in any way, and various modifications can be made without departing from the spirit of the present invention. The structures of the above-described embodiments are merely examples, and the scope of the present invention is not limited to the scope of their descriptions. The scope of the present invention is indicated by the descriptions in the claims, and includes equivalents of the descriptions in the claims and all changes within the scope.

In the above-described embodiments, the path cross-sectional area A3 of the top wall side inlet 133a, the path cross-sectional area A5 of the bottom wall side outlet 135a, the path cross-sectional area A2 of the first and second side wall side paths 131, 132, and the path cross-sectional area A4 of the battery paths 134 satisfy the following magnitude relationships. That is, they are set so as to satisfy all four conditions such as A3>A2, A5>A2, A3>A4, and A5>A4. In this regard, the present invention suffices if at least one of these four conditions are met, and all of the four conditions need not to be satisfied.

Regarding the magnitude relationship of the path cross-sectional area A3 of the top wall side inlet 133a and the path cross-sectional area A5 of the bottom wall side outlet 135a, it may be any one of A5>A3, A5<A3, and A5=A3.

Regarding the magnitude relationship of the path cross-sectional area A4 of the battery paths 134 and the path cross-sectional area A2 of the first and second side wall side paths 131, 132, it may be any one of A4>A2, A4<A2, and A4=A2.

In the second embodiment, the top wall 111 is bent to form protruding parts 111a. The protruding parts 111a may be formed as members that are separate from the top wall 111, and the protruding parts 111a may be attached to the top wall 111.

In the second embodiment, the protruding parts 111a are formed so as to extend along the top wall with such a length that they face the entire top wall side inlets 133a in the longitudinal direction. In contrast, the protruding units 111a may be formed to be shorter, or a plurality of pin-shaped protruding parts 111a may be arranged side by side parallel to the longitudinal direction of the top wall side inlets 133a. Alternatively, the protruding parts 111a may be omitted.

In the first embodiment, the first internal fins 151 are arranged in an inclined manner so as to guide the flow direction of the fluid that has flown horizontally into the first and second side wall side paths 131, 132 to the top wall side path 133. In contrast, the first internal fins 151 may be arranged horizontally so as to extend in the horizontal direction to the first and second side wall side paths 131, 132. In this case, after passing through the first internal fins 151, the fluid flowing through the first and second side wall side paths 131, 132 changes its direction upward and flows into the top wall side inlets 133a. At least one of the first internal fin 151 and the second internal fin 152 may be omitted.

The first internal fins 151 and the second internal fins 152 are not limited to straight fins but may also be pin-shaped fins or corrugated fins, for example.

The battery pack 100 of the first embodiment is configured such that a plurality of blowers 140A and 140B circulate the fluid through the circulation path 130, but it is also possible to use, for example, a single blower, or three or more blowers to circulate the fluid through the circulation path 130.

Besides the sirocco fan described in the first embodiment, an axial flow fan, a turbo fan, or the like can be used as the fans built in the blowers 140A and 140B provided in the case 110.

Further, the PTC heater 144 need not to be provided inside the fan casing 143, and instead it may be provided outside the fan casing 143 and inside the case 110.

The internal fins and the external fins in each of the above-described embodiments may be fins separate from the walls of the case 110 that are fixed to the walls, or fins that are formed by forming parts of the walls of the case 110 into fin shapes.

In the fourth embodiment, the tips of the fin parts 151c are brought into contact with the cover 122, but it may also be brought into contact with the outer case 121b of the battery cell 121.

In the first embodiment, the inflow side space Sin is defined as a space facing the inlets 134a of the battery paths 134. In contrast, the spaces facing the inlets 134a of the battery paths 134 may be connected in the lamination direction of the cell lamination 120A (the direction perpendicular to the sheet in FIG. 13) to form an enlarged space, and the connected space may be defined as the inflow side space Sin. That is, the space above the cell laminate 120A in the top wall side path 133 may be defined as the inflow side space Sin. Further, in the first embodiment, a plurality of laminated cells 120A are accommodated in the case 110. The spaces above the laminated cells 120A may be connected form an enlarged space, and this connected space may be defined as the inflow side space Sin.

In the first embodiment, the outflow side space Sout is defined as a space facing the outlet 134b of the battery path 134. In contrast, the spaces facing the outlets 134b of the battery paths 134 may be connected in the lamination direction of the cell lamination 120A (the direction perpendicular to the sheet in FIG. 13) to form an enlarged space, and the connected space may be defined as the outflow side space Sout. That is, the space under the cell laminate 120A in the bottom wall side path 135 may be defined as the outflow side space Sout.

In the above-described embodiments, the case 110 forms a hexahedron, a cuboid, but the shape of the housing of the invention is not limited to this shape. For example, the case 110 may be a polyhedron having more than six faces, or at least one face may be a face including a curved face. Further, the case 110 may be configured in a dome form with a top wall having a curved face, or the longitudinal sectional shape of the casing may be a trapezoidal shape. In the case 110, the top wall is a wall in a positional relationship opposed to the bottom wall, and its shape may include a flat face or a curved face. In the case 110, the side walls may either be walls extending from the bottom wall in a direction intersecting with the bottom wall, or walls extending from the top wall in a direction intersecting with the top wall. The boundaries between the top wall and the side walls of the case 110 may form corners or curved faces. The boundaries between the bottom wall and the side walls of the case 110 may form corners or curved faces.

In the above-described embodiments, the number of laminated cells 120A in the battery pack is four, but their number is not limited to this. That is, the battery pack may include, in the housing, only one cell lamination 120A, a plurality of laminated cells 120A arranged in one direction, or a plurality of laminated cells 120A arranged in more than one intersecting directions.

In the above-described embodiments, the laminated cells 120A are oriented in the housing so that the positive terminals 121c and the negative terminals 121d face the top wall 111. In contrast, the laminated cells 120A may be oriented so that the positive terminals 121c and the negative terminals 121d face the first and second side walls 113, 114.

REFERENCE SIGNS LIST

100 . . . Battery pack
110 . . . Case (housing)
121 . . . Battery cell
130 . . . Circulation path
131, 132 . . . Side wall side path (path along housing)
134 . . . Battery path
134a, 134c . . . Inlet of battery path
134b . . . Outlet of battery path
140 . . . Blower
Sin . . . Inflow side space
Sout . . . Outflow side space
V1 . . . Flow velocity in path along housing
V2 . . . Flow velocity in inflow side space
V3 . . . Flow velocity in battery path
V4 . . . Flow velocity in outflow side space

The invention claimed is:
1. A battery pack comprising:
a plurality of battery cells;
a housing accommodating the battery cells therein;

a circulation path formed in the housing and through which a heat exchange fluid circulates so as to transfer the heat of the battery cells to the housing; and a blower for causing the fluid to flow through the circulation path, wherein:

the circulation path comprises:
- a plurality of battery paths formed by gaps between adjacent battery cells,
- an inflow side space which is a space facing inlets of the battery paths, and
- an outflow side space which is a space facing outlets of the battery paths, a path along the housing which is a path that is different from the inflow side space and the outflow side space and extends along one or more inner surfaces of the housing, the circulation path is formed such that both of a flow velocity of the fluid in the inflow side space and a flow velocity of the fluid in the outflow side space are slower than a flow velocity of the fluid in the path along the housing, fins for exchanging heat with the fluid protruding into the path along the housing are provided on an inner surface of the housing, the path along the housing is divided into a fin region where the fins are arranged and a finless region communicating with the upstream side of the fin region and where the fins are not arranged, and an area of a fin inlet which is an inlet through which the fluid flows into the fin region is larger than an area of a finless inlet which is an inlet through which the fluid flows into the finless region.

2. The battery pack according to claim 1, wherein, the circulation path is formed such that both of the flow velocity of the fluid in the inflow side space and the flow velocity of the fluid in the outflow side space are slower than a flow velocity of the fluid in the battery paths.

3. The battery pack according to claim 1, wherein, the fins are straight fins extending straight.

4. The battery pack according to claim 1, wherein, the battery pack further comprises a sealant which seals a gap between the fins and the battery cells.

5. The battery pack according to claim 1, wherein,
the path along the housing is a path communicating with the inflow side space,
the inflow side space is a space formed between an inner surface of the housing and the battery cells, and
a protruding part protruding into the inflow side space is provided on the inner surface of the housing.

6. The battery pack according to claim 5, wherein,
the protruding part has a shape extending along the inner surface of the housing so as to face a communication port which is a part of the inflow side space that communicates with the path along the housing.

7. The battery pack according to claim 1, wherein,
the circulation path is formed such that the whole amount of the fluid flows through the battery paths.

8. The battery pack according to claim 1, wherein,
the circulation path is formed such that the whole amount of the fluid flows through the path along the housing.

* * * * *